United States Patent [19]
Senda

[11] Patent Number: 5,719,630
[45] Date of Patent: Feb. 17, 1998

[54] APPARATUS FOR COMPRESSIVE CODING IN MOVING PICTURE CODING DEVICE

[75] Inventor: Yuzo Senda, Tokyo, Japan

[73] Assignee: NEC Corporation, Tokyo, Japan

[21] Appl. No.: 351,514

[22] Filed: Dec. 7, 1994

[30] Foreign Application Priority Data

Dec. 10, 1993 [JP] Japan ..................... 5-310519
Dec. 28, 1993 [JP] Japan ..................... 5-334528

[51] Int. Cl.$^6$ ..................................... H04N 7/36
[52] U.S. Cl. .............................. 348/416; 348/699
[58] Field of Search ........................ 348/409, 415, 348/416, 699, 412, 413

[56] References Cited

U.S. PATENT DOCUMENTS

| | | | |
|---|---|---|---|
| 4,937,666 | 6/1990 | Yang | 348/413 |
| 5,489,949 | 2/1996 | Jeong et al. | 348/699 |

OTHER PUBLICATIONS

Telecommunication Standardization Sector Study Group 15, . . . (Raporteur's Group on Part of Q.2/15), in Document AVC-491b, Version 2, Apr., 1993, pp. 1-119.

*Primary Examiner*—Amelia Au
*Attorney, Agent, or Firm*—Sughrue, Mion, Zinn, Macpeak & Seas

[57] ABSTRACT

In a moving picture coding device including a memory for storing a referenced picture, a motion vector search device comprises a primary predictive evaluation section and a subsidiary predictive evaluation section. Supplied with an input picture and connected to the memory, the primary predictive evaluation section carries out a primary motion vector search by generating primary predicted pictures using the input picture and the referenced picture to produce primary prediction error evaluated values. Connected to the primary predictive evaluation section, the subsidiary predictive evaluation section carries out a subsidiary motion vector search to estimate at least one subsidiary prediction error evaluated value using the primary prediction error evaluated values. The subsidiary predictive evaluation section therefore carries out the subsidiary motion vector search without generation of subsidiary predicted pictures.

15 Claims, 12 Drawing Sheets

APPARATUS FOR COMPRESSIVE CODING IN MOVING PICTURE CODING DEVICE

BACKGROUND OF THE INVENTION

This invention relates to compressive coding of a digital video signal and, in particular, to motion-compensated predictive coding of the digital video signal.

Compressive coding technique for the digital video signal is a technique for drastically compressing huge information contents of the digital video signal using temporal correlation and spatial correlation in the digital video signal and using visual characteristics of human beings. The compressive coding technique for the digital video signal comprises several element techniques.

An interframe predictive coding technique is a technique using the temporal correlation in the digital video signal. As well known in the art, the digital video signal represents successive pictures each of which may correspond to a frame of the digital video signal when the digital video signal is, for example, a television signal. An interframe predictive coding method makes use of the temporal correlation between two successive ones of successive frames. More particularly, the interframe predictive coding method predicts a current frame on the basis of a past frame, which is already coded, to transmit a predictive error signal. There are various improved methods of the interframe predictive coding method. A motion-compensated interframe predictive coding method takes into account a movement of each picture. As well known in the art, each frame is divided into two fields. An interfield predictive coding method makes use of the temporal correlation between two successive fields instead of successive frames. A dual-field predictive coding method carries out prediction on the basis of two fields. An interpolative predictive coding method carries out interpolation on the basis of frames in both future and past with the frame in the future previously coded. In addition, an adaptive predictive coding method adaptively switches the above-mentioned predictive coding methods.

A transform coding technique is a technique for compressing information contents of the digital video signal by linear transformation on a plurality of signals. In a transform coding method, the digital video signal is divided into data blocks each of which consists of a plurality of picture elements (pixels). The transform coding method makes use of the spatial correlation in the predictive error signal obtained by the above-mentioned adaptive predictive coding method. By this linear transformation, spatial redundancy of the digital video signal is eliminated. The transform coding method is classified into transform coding in each frame, transform coding in the each field, and transform coding in horizontal direction alone. In addition, an adaptive transform coding method adaptively switches the above-mentioned transform codings.

A variable length coding technique is a technique for compressing information contents using offset in probabilistic distribution of signal levels. In general, the variable length coding technique is adopted in the motion vector obtained by the above-mentioned adaptive predictive coding method and transform coefficients obtained by the above-mentioned adaptive transform coding method.

A generally used compressive coding technique for the digital video signal achieves a very high compressibility by using these techniques.

In a moving picture coding device using such compressive coding techniques for digital video signals, it is necessary to mount a motion vector search device for motion-compensated interframe predictive coding. For example, it is possible in an MPEG (moving picture experts group)-1 system of international standard (ISO IS11172-2) to carry out motion-compensated interframe predictive coding with half-pixel accuracy. In general, a motion vector searcher must carry out a lot of calculations and become large in scale to achieve high-precision. In prior art, the motion vector searcher is maintained small in scale by carrying out a multi-stage motion vector search. However, it is difficult to mount a conventional motion detector in moving picture coding device in the manner which will later be described.

The MPEG-1 system is able to carry out three motion-compensated predictions, namely, a forward prediction, a backward prediction, and an interpolative prediction. The forward prediction is a motion-compensated prediction with reference to a frame in the past that temporally elapses in the forward direction. The backward prediction is a motion-compensated prediction with reference to a frame in the future that temporally elapses in the backward direction. The interpolative prediction is a motion-compensated prediction with reference to two frames in both the future and the past. It is assumed that the digital video signal in conformity to ITU-R Rec. 601 is coded at a bit rate of 4 Mbits/sec. In this event, introduction of the interpolative prediction improves signal-to-noise ratio (SNR) by a maximum of 2 dB.

An MPEG-2 system (ISO CD13818-2) is described by Telecommunication Standardization Sector Study Group 15, Experts Group for ATM Video Coding (Rapporteur's Group on Part of Q.2/15), in Document AVC-491b, Version 2, April, 1993, pages 1–119, under the title of "Test Model 5". The MPEG-2 system, which is becoming the standard, is able to combine two prediction modes (a frame prediction available for coding of progressive scanned pictures and a field prediction available for coding of interlaced scanned pictures) with three modes of the forward prediction, the backward prediction, and the interpolative prediction. The MPEG-2 system includes a dual-field prediction which is a motion-compensated prediction with reference to successive two fields in the past that temporally elapses in the forward direction. The dual-field prediction operates similarly to the interpolative prediction and introduction of the dual-field prediction improves SNR by the degree of the introduction of the interpolative prediction.

However, it is necessary to suitably select many available prediction modes in order to have a high performance for a highly adaptive coding system. In particular, it is necessary for the adaptive motion-compensated predictive coding to evaluate prediction errors in all of the prediction modes. That is, in comparison with a simple motion-compensated interframe predictive coding, the adaptive motion-compensated predictive coding requires a lot of predicted pictures to determine a prediction mode. As a result, a conventional moving picture coding device must comprise a prediction mode determiner with a large scale, in the manner which will later be described.

SUMMARY OF THE INVENTION

It is therefore an object of this invention to provide a motion vector searcher which is capable of reducing an amount of calculations without degradation of performance in a motion-compensated predictive coding.

It is another object of this invention to provide a motion vector searcher of the type described, which is capable of reducing a circuitry scale thereof without degradation of performance in the motion-compensated predictive coding.

It is still another object of this invention to provide a prediction mode determiner which is capable of reducing a circuitry scale thereof without degradation of performance in an adaptive motion-compensated predictive coding.

Other objects of this invention will become clear as the description proceeds.

On describing the gist of an aspect of this invention, it is possible to understand that a motion vector search device is for use in a moving picture coding device including a memory for storing a referenced picture.

According to the above-mentioned aspect of this invention, the above-understood motion vector search device comprises a primary predictive evaluation section, supplied with an input picture and connected to the memory, for carrying out a primary motion vector search by generating primary predicted pictures using the input picture and the referenced picture to produce primary prediction error evaluated values. Connected to the primary predictive evaluation section, a subsidiary predictive evaluation section carries out a subsidiary motion vector search to estimate at least one subsidiary prediction error evaluated value using the primary prediction error evaluated values. The subsidiary predictive evaluation section therefore carries out the subsidiary motion vector search without generation of subsidiary predicted pictures.

On describing the gist of a different aspect of this invention, it is possible to understand that a motion vector searcher is for use in a moving picture coding device including a memory for storing a referenced picture.

According to the different aspect of this invention, the afore-mentioned motion vector searcher comprises a first motion vector searching section, supplied with an input picture and connected to the memory, for carrying out a first motion vector search with full pixel accuracy by generating primary motion-compensated predictive pictures with the full pixel accuracy using the input picture and the referenced picture to produce primary prediction error evaluated values for motion vectors with the full pixel accuracy. Connected to the first motion vector searching section, a second motion vector searching section carries out a second motion vector search with half-pixel accuracy to estimate subsidiary prediction error evaluated values for motion vectors with the half-pixel accuracy using the primary prediction error evaluated values. The second motion vector searching section therefore carries out the second motion vector search without generation of subsidiary motion-compensated predictive pictures with the half-pixel accuracy.

On describing the gist of a further aspect of this invention, it is possible to understand that a prediction mode determiner is used in a moving picture coding device for carrying out adaptive predictive coding on an input picture. The moving picture coding device includes a memory for storing a referenced picture.

According to a further aspect of this invention, the above-mentioned prediction mode determiner comprises a first prediction mode evaluating section, supplied with the input picture and connected to the memory, for evaluating a first prediction mode group by generating primary predicted pictures using the input picture and the referenced picture. The first prediction mode group is a prediction mode group referring to a single frame or a single field. The first prediction mode evaluating section produces primary prediction error evaluated values for the first prediction mode group. Connected to the first prediction mode evaluating section, a second prediction mode evaluating section evaluates a second prediction mode group using the primary prediction error evaluated values. The second prediction mode group is a prediction mode group referring to a plurality of frames or a plurality of fields. The second prediction mode evaluating section estimates a subsidiary prediction error evaluated value for the second prediction mode group using the primary prediction error evaluated values. The second prediction mode evaluating section therefore evaluates the section prediction mode group without generation of subsidiary predicted pictures for the second prediction mode group. Connected to the first and the second prediction mode evaluating sections, a prediction mode selecting section selects a prediction mode having a minimum one among the primary prediction error evaluated values and the subsidiary prediction error evaluated value.

DESCRIPTION OF THE PREFERRED EMBODIMENTS

Figure 1:
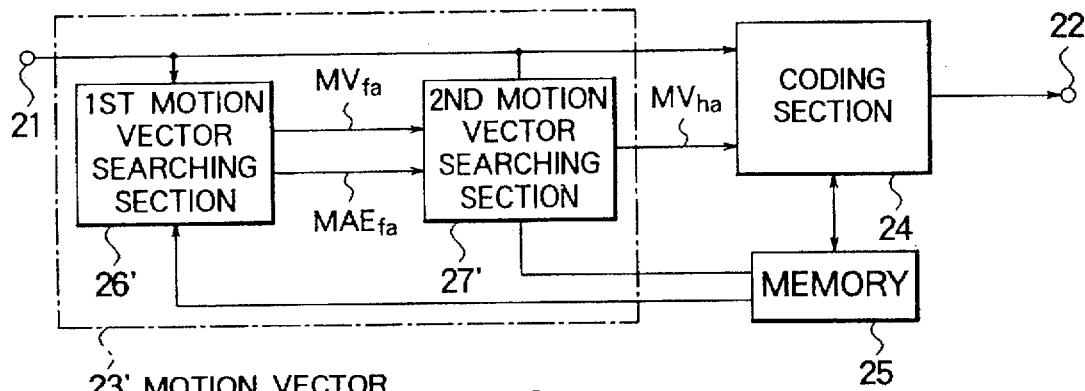
FIG. 1 is a block diagram of a conventional moving picture coding device.

Referring to FIG. 1, a conventional moving picture coding device will at first be described in order to facilitate an understanding of the present invention. In the example being illustrated, the moving picture coding device is a motion-compensated predictive coding device of a two-stage motion vector searching type with half-pixel accuracy. The moving picture coding device has an input terminal 21 supplied with an input digital video signal. The moving picture coding device codes the input digital video signal in accordance with motion-compensated predictive coding into an output coded video signal. The moving picture coding device has an output terminal 22 for producing the output coded video signal.

The input digital video signal represents successive pictures which may be called frames or fields. Each of the successive pictures is divided into a predetermined number of blocks of picture elements (pixels). In the example being illustrated, each block consists of sixteen pixels by sixteen lines. At any rate, an input picture of the input digital video signal is supplied to the input terminal 21 by the block in coding processing order. The input picture is called a current picture.

The moving picture coding device comprises a conventional motion vector searcher 23', a coding section 24, and a memory 25. The motion vector searcher 23' is supplied with the input digital video signal. In addition, the motion vector searcher 23' is supplied with a referenced picture from the memory 25. In the manner which will later be described more in detail, the motion vector searcher 23' searches a final motion vector $MV_{ha}$ representative of a movement of each block between the input picture and the referenced picture to produce the final motion vector $MV_{ha}$. The final motion vector $MV_{ha}$ is a motion vector with half-pixel accuracy.

The coding section 24 is supplied with the input picture of the input digital video signal and with the final motion vector $MV_{ha}$ from the motion vector searcher 23'. The coding section 24 carries out motion-compensated predictive coding on an input block in the input picture for each block using the final motion vector $MV_{ha}$ to produce the output coded video signal. In addition, the coding section 24 locally decodes the output coded video signal using the final motion vector $MV_{ha}$ to produce a local decoded picture. The coding section 24 supplies the local decoded picture to the memory 25. The memory 25 stores the local decoded picture as the referenced picture.

The motion vector searcher 23' comprises a first motion vector searching section 26' and a second motion vector searching section 27'. The first motion vector searching section 26' searches a primary motion vector $MV_{fa}$ with reference to the input block and the referenced picture. The primary motion vector $MV_{fa}$ is a motion vector with full pixel accuracy. More specifically, the first motion vector searching section 26' generates a plurality of primary motion-compensated predictive pictures for respective primary candidate vectors between a vector search range (±14, ±7) for each block. Each primary motion-compensated predictive picture is a motion-compensated predictive picture with full pixel accuracy. Each primary candidate vector is a candidate vector with full pixel accuracy. The first motion vector searching section 26' calculates a plurality of primary prediction error evaluated values by comparing the input block with the primary motion-compensated predictive pictures. Each primary prediction error evaluated value is a prediction error evaluated value with full pixel accuracy. The first motion vector searching section 26' supplies the minimum primary prediction error evaluated value $MAE_{fa}$ and the corresponding primary motion vector $MV_{fa}$ to the second motion vector searching section 27'. In the example being illustrated, the minimum primary prediction error evaluated value $MAE_{fa}$ represents a mean absolute error MAE.

Figure 2:
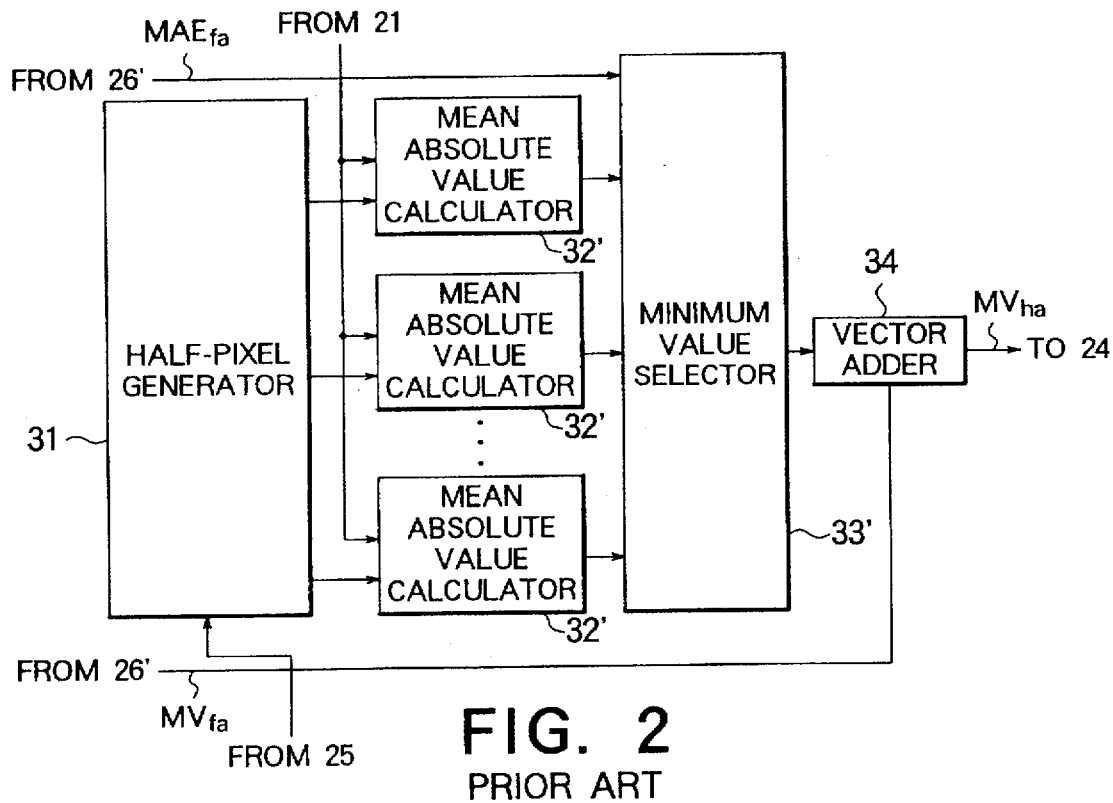
FIG. 2 is a block diagram of a conventional second motion vector searching section for use in the conventional moving picture coding device illustrated in FIG. 1.

Turning to FIG. 2, the second motion vector searching section 27' searches a subsidiary motion vector $MV_{ha}$ with reference to the minimum primary prediction error evaluated value $MAE_{fa}$, the primary motion vector $MV_{fa}$, and the referenced picture. The subsidiary motion vector $MV_{ha}$ is identical with the final motion vector. More particularly, the second motion vector searching section 27' comprises a half-pixel generator 31, eight mean absolute value calculators 32', a minimum value selector 33', and a vector adder 34.

The half-pixel generator 31 generates, using the referenced picture stored in the memory 25 (FIG. 1), eight subsidiary motion-compensated predictive pictures for eight subsidiary candidate vectors in eight neighboring half-pixel positions (±0.5, ±0.5) of the primary motion vector $MV_{fa}$ for each block. Each subsidiary motion-compensated predictive picture is a motion-compensated predictive picture with half-pixel accuracy. Each subsidiary candidate vector is a candidate vector with half-pixel accuracy. The eight subsidiary motion-compensated predictive pictures are supplied to the eight mean absolute value calculators 32 each of which is supplied with the input block.

Figure 3:
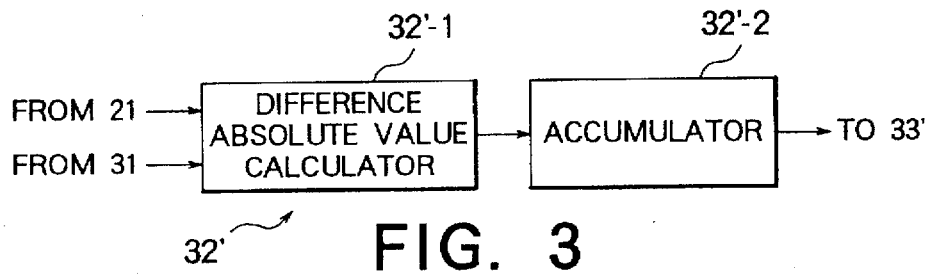
FIG. 3 is a block diagram of a mean absolute value calculator for use in the conventional second motion vector searching section illustrated in FIG. 2.

Turning to FIG. 3, the eight mean absolute value calculators 32' calculate eight subsidiary prediction error evaluated values by comparing the input block with the eight subsidiary motion-compensated predictive pictures. Each subsidiary prediction error evaluated value is a prediction error evaluated value with half-pixel accuracy. More specifically, each mean absolute value calculator 32' comprises a difference absolute value calculator 32'-1 and an accumulator 32'-2. The difference absolute value calculator 32'-1 calculates a difference absolute value for each pixel between each input pixel of the input block and each predictive pixel of the subsidiary motion-compensated predictive picture. The accumulator 32'-2 accumulates the difference absolute value for each pixel to produce an accumulated value as the subsidiary prediction error evaluated value.

Turning back to FIG. 2, the eight subsidiary prediction error evaluated values are supplied to the minimum value selector 33' which is supplied with the primary prediction error evaluated value $MAE_{fa}$ from the first motion vector searching section 26'. The minimum value selector 33' selects, as a selected candidate differential vector, the candidate differential vector having the minimum one of the eight subsidiary prediction error evaluated values and the primary prediction error evaluated value. The selected differential candidate vector is supplied to the vector adder 34 which is supplied with the primary motion vector $MV_{fa}$ from the first motion vector searching section 26'. The vector adder 34 vector-adds the primary motion vector $MV_{fa}$ to the selected differential candidate vector to produce the subsidiary motion vector $MV_{ha}$. The subsidiary motion vector $MV_{ha}$ is supplied to the coding section 24 (FIG. 1).

In the conventional moving picture coding device, the conventional motion vector searcher 23' carries out the motion vector searching by the multistage, which results in reducing the amount of calculations and the circuitry scale. However, it is difficult to incorporate the conventional motion vector searcher 23' into the moving picture coding device because the conventional motion vector searcher 23' comprises the second motion vector searching section 27' which is complex in structure.

Figure 4:
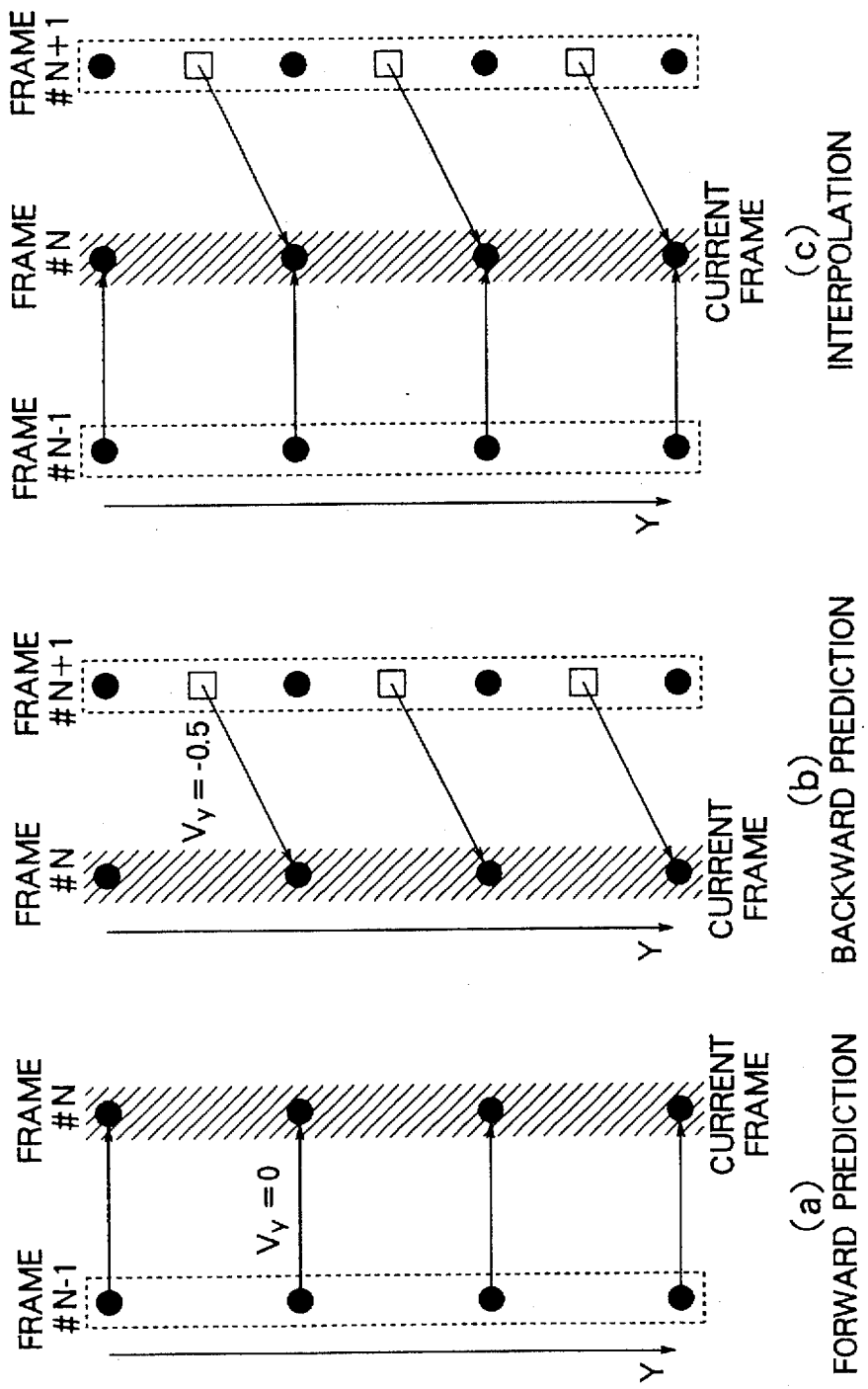
FIGS. 4(a) through (c) are views for use in describing operation of forward prediction, backward prediction, and interpolative prediction.

Referring to FIGS. 4(a), (b), and (c), description will be made as regards operation of forward prediction, backward prediction, and interpolative prediction which are defined by the MPEG-1 system. In FIGS. 4(a), (b), and (c), it is assumed that a current frame, a past frame, and a future frame have the frame numbers of N, (N−1), and (N+1), respectively.

In FIG. 4(a), the forward prediction motion-compensatedly predicts the current frame N on the basis of the past frame (N−1) by a motion vector Vy which is equal to zero. In FIG. 4(b), the backward prediction motion-compensatedly predicts the current frame N on the basis of the future frame (N+1) by the motion vector Vy which is equal to −0.5. In FIG. 4(c), the interpolative prediction linearly interpolates the current frame N by the averaging of the past frame (N−1) and the future frame (N+1).

Figure 5:
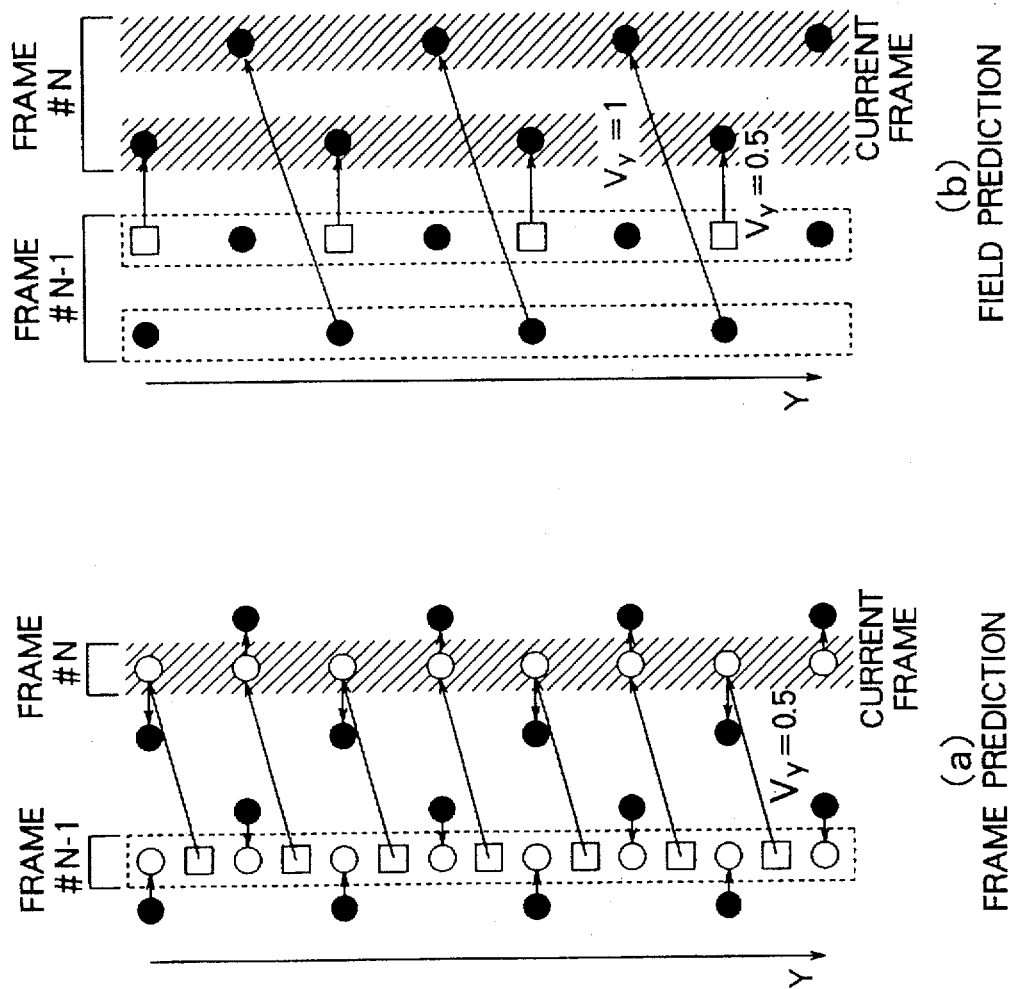
FIGS. 5(a) and (b) are views for use in describing operation of frame prediction and field prediction in the forward prediction.

Referring to FIGS. 5(a) and (b), description will be made as regards operation of frame prediction and field prediction in the forward prediction which are defined by the MPEG-2 system.

In the frame prediction of FIG. 5(a), each picture is progressively scanned to produce a frame. The current frame N is motion-compensatedly predicted on the basis of the past frame (N−1) by the motion vector Vy which is equal to 0.5.

In the field prediction of FIG. 5(b), each picture is interlacedly scanned to produce a frame which consists of two fields. The two fields of the current frame are motion-compensatedly predicted on the basis of two fields of the past frame (N−1) by the motion vectors Vy which are equal to 1 and 0.5, respectively.

Figure 6:
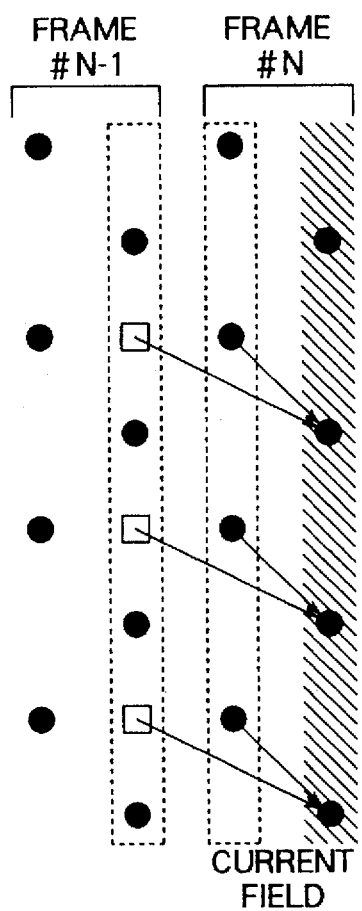
FIG. 6 is a view for use in describing operation of dual-field prediction.

Referring to FIG. 6, description will be made as regards operation of dual-field prediction which is defined by the MPEG-2 system. In the dual-field prediction, prediction of a current field of the current frame is carried out by using not only the same-parity field of two fields before but also the different-parity field of one field before and by averaging motion-compensated prediction results of both of the same-parity field and the different-parity field. The dual-field prediction can use a set of motion vectors (f0x, f0y, f1x, f1y) where (f0x, f0y) represent the motion vectors for the same-parity field and (f1x, f1y) represent the motion vectors for the different-parity field which are restricted by Equations as follows:

$$2 \times f1x = (2 \times f0x)//2 + dx, \quad (1)$$

and $$2 \times f1y = (2 \times f0y)//2 + dy + e, \quad (2)$$

where // represents an operator of rounding integer division, f0x, f0y, f1x, and f1y represent the motion vectors with half-pixel accuracy, dx and dy represent integers between −1 and 1, both inclusive, and e represents −1 and 1 when the current field is positioned in the upper and the lower of the current frame, respectively.

Figure 7:
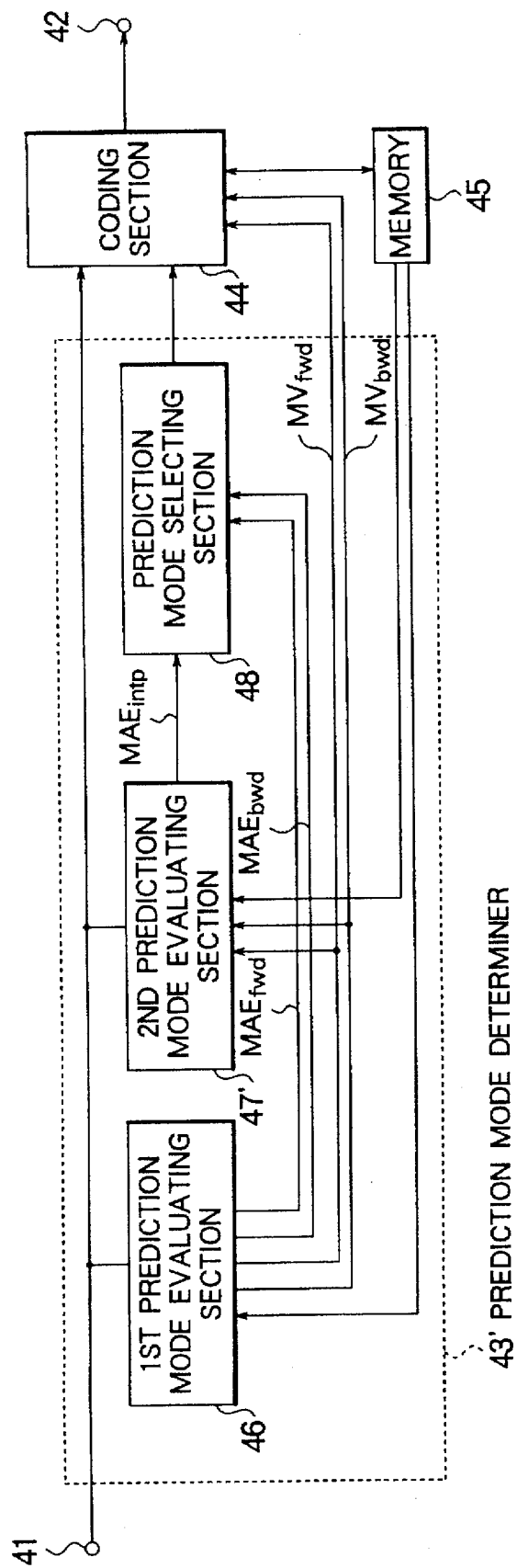
FIG. 7 is a block diagram of another conventional moving picture coding device.

Referring to FIG. 7, another conventional moving picture coding device will be described in order to facilitate an understanding of the present invention. The moving picture coding device has an input terminal 41 supplied with an input digital video signal. The moving picture coding device codes the input digital video signal in accordance with motion-compensated predictive coding into an output coded video signal. The moving picture coding device has an output terminal 42 for producing the output coded video signal.

The input digital video signal represents successive pictures which may be called frames or fields. Each of the successive pictures is divided into a predetermined number of blocks of picture elements (pixels). In the example being illustrated, each block consists of sixteen pixels by sixteen lines. At any rate, an input picture of the input digital video signal is supplied to the input terminal 41 by the block in coding processing order.

The moving picture coding device comprises a conventional prediction mode determiner 43', a coding section 44, and a memory 45. The prediction mode determiner 43' is supplied with the input digital video signal and a referenced picture from the input terminal 41 and the memory 45, respectively. The prediction mode determiner 43' is operable in first and second prediction mode groups for adaptive predictive coding. The first prediction mode group comprises a forward prediction mode and a backward prediction mode each of which refers to a signal frame alone. The second prediction mode group comprises an interpolative prediction mode using the average value from the forward prediction and the backward prediction.

The prediction mode determiner 43' carries out prediction mode determination for the adaptive predictive coding. The prediction mode determiner 43' comprises a first prediction mode evaluating section 46, a second prediction mode evaluating section 47', and a prediction mode selecting section 48. The first prediction mode evaluating section 46 evaluates the first prediction mode group in the manner which will later be described. The second prediction mode evaluating section 47' evaluates the second prediction mode group in the manner which will later be described.

The first prediction mode evaluating section 46 is supplied with the input picture of the input digital video signal from the input terminal 41. In addition, the first prediction mode evaluating section 46 is supplied with the referenced picture from the memory 45. The first prediction mode evaluating section 46 searches a forward predicted motion vector $MV_{fwd}$ and a backward predicted motion vector $MV_{bwd}$ with reference to the input picture and the referenced picture for each block. Each of the forward predicted motion vector $MV_{fwd}$ and the backward predicted motion vector $MV_{bwd}$ is called a primary predicted motion vector. The first prediction mode evaluating section 46 supplies the forward predicted motion vector $MV_{fwd}$ and the backward predicted motion vector $MV_{bwd}$ to the second prediction mode evaluating section 47' and the coding section 44. In addition, the first prediction mode evaluating section 46 obtains a forward prediction error evaluated value $MAE_{fwd}$ and a backward prediction error evaluated value $MAE_{bwd}$ as well known in the art. Each of the forward prediction error evaluated value $MAE_{fwd}$ and the backward prediction error evaluated value $MAE_{bwd}$ is called a primary prediction error evaluated value. The first prediction mode evaluating section 46 supplies the forward prediction error evaluated value $MAE_{fwd}$ and the backward prediction error evaluated value $MAE_{fwd}$ to the prediction mode selecting section 48.

The second prediction mode evaluating section 47' is supplied with the input picture of the input digital video signal and the referenced picture from the input terminal 41 and the memory 45, respectively. In addition, the second prediction mode evaluating section 47' is supplied with the forward predicted motion vector $MV_{fwd}$ and the backward predicted motion vector $MV_{bwd}$ from the first prediction mode evaluating section 46. The second prediction mode evaluating section 47' generates an interpolative predicted picture for each block with reference to the forward predicted motion vector $MV_{fwd}$, the backward predicted motion vector $MV_{bwd}$, and the referenced picture. The second prediction mode evaluating section 47' carries out prediction error evaluation by the input picture with the interpolative predicted picture to obtain an interpolative prediction error evaluated value $MAE_{intp}$. The interpolative prediction error evaluated value $MAE_{intp}$ is called a subsidiary prediction error evaluated value. The second prediction mode evaluating section 47' supplies the interpolative prediction error evaluated value $MAE_{intp}$ to the prediction mode selecting section 48.

The prediction mode selecting section 48 is supplied with the forward prediction error evaluated value $MAE_{fwd}$, the backward prediction error evaluated value $MAE_{bwd}$, and the interpolative prediction error evaluated value $MAE_{intp}$. The prediction mode selecting section 48 selects, as a selected prediction mode, one of the forward prediction mode, the backward prediction mode, and the interpolative prediction mode that has the minimum one among the forward prediction error evaluated value $MAE_{fwd}$, the backward prediction error evaluated value $MAE_{bwd}$, and the interpolative prediction error evaluated value $MAE_{intp}$. The prediction mode selecting section 48 supplies a selected prediction mode signal indicative of the selected prediction mode to the coding section 44.

The coding section 44 is supplied with the input picture of the input digital video signal, the selected prediction mode signal, the forward predicted motion vector $MV_{fwd}$, and the backward predicted motion vector $MV_{bwd}$. The coding section 44 carries out motion-compensated predictive coding on the input picture using the forward predicted motion vector $MV_{fwd}$ and the backward predicted motion vector $MV_{bwd}$ on the basis of the selected prediction mode to produce the output coded video signal. In addition, the coding section 44 carries out local decoding by using the output coded signal and the referenced picture to produce a local decoded picture. The coding section 44 supplies the local decoded picture to the memory 45. The memory 45 stores the local decoded picture as the referenced picture.

Figure 8:
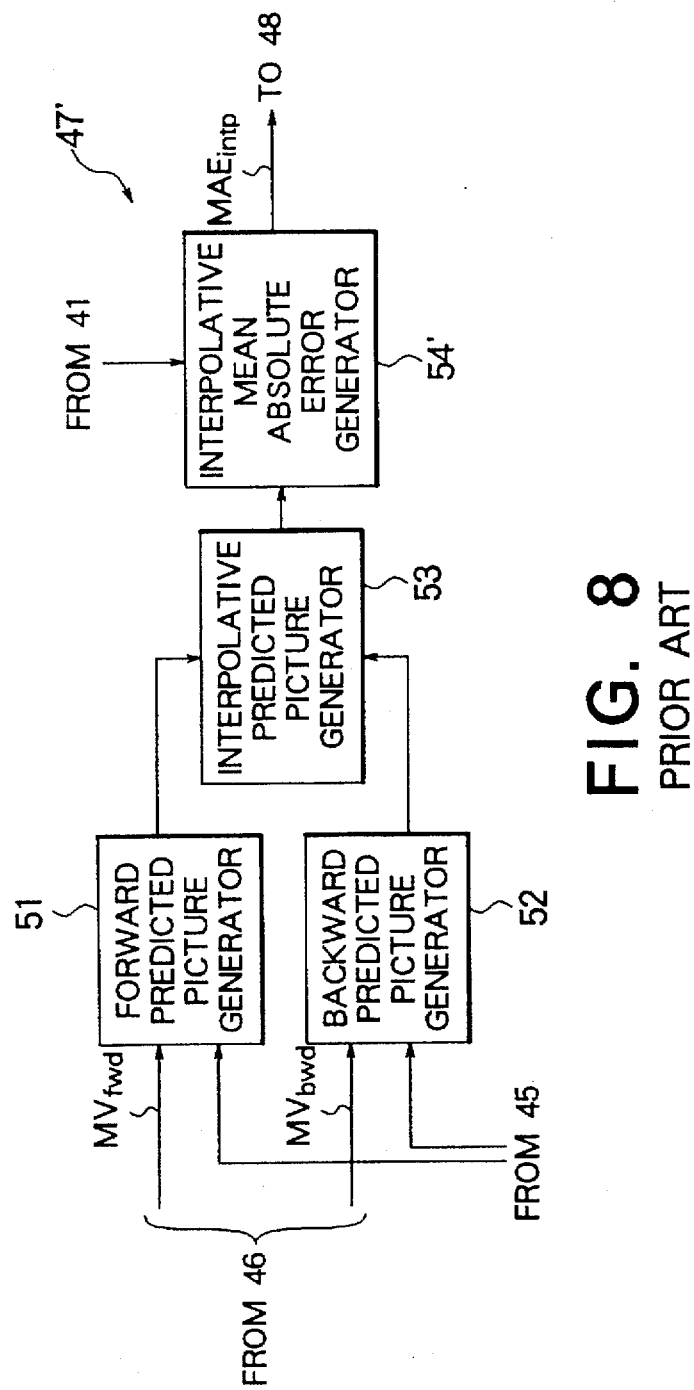
FIG. 8 is a block diagram of a conventional second prediction mode evaluating section for use in the conventional moving picture coding device illustrated in FIG. 7.

Turning to FIG. 8, the second prediction mode evaluating section 47' comprises a forward predicted picture generator 51, a backward predicted picture generator 52, an interpolative predicted picture generator 53, and an interpolative mean absolute error calculator 54'.

The forward predicted picture generator 51 is supplied with the forward predicted motion vector $MV_{fwd}$ and the referenced picture from the first prediction mode evaluating section 46 and the memory 45, respectively. The forward predicted picture generator 51 generates a forward predicted picture using the forward predicted motion vector $MV_{fwd}$ and the referenced picture. The backward predicted picture generator 52 is supplied with the backward predicted motion vector $MV_{bwd}$ and the referenced picture from the first prediction mode evaluating section 46 and the memory 45, respectively. The backward predicted picture generator 52 generates a backward predicted picture using the backward predicted motion vector $MV_{bwd}$ and the referenced picture. The interpolative predicted picture generator 53 is supplied with the forward predicted picture and the backward predicted picture from the forward predicted picture generator 51 and the backward predicted picture generator 52, respectively. The interpolative predicted picture generator 53 generates an interpolative predicted picture using the forward predicted picture and the backward predicted picture. The interpolative mean absolute error calculator 54 is supplied with the interpolative predicted picture and the input picture from the interpolative predicted picture generator 53 and the input terminal, respectively. The interpolative mean absolute error calculator 54' calculates the interpolative mean absolute error $MAE_{intp}$ by comparing the interpolative predicted picture with the input picture.

As apparent from FIG. 8, the second prediction mode evaluating section 47' is complex in structure. As a result, the conventional prediction mode determiner 43' has a large circuitry scale.

Figure 9:
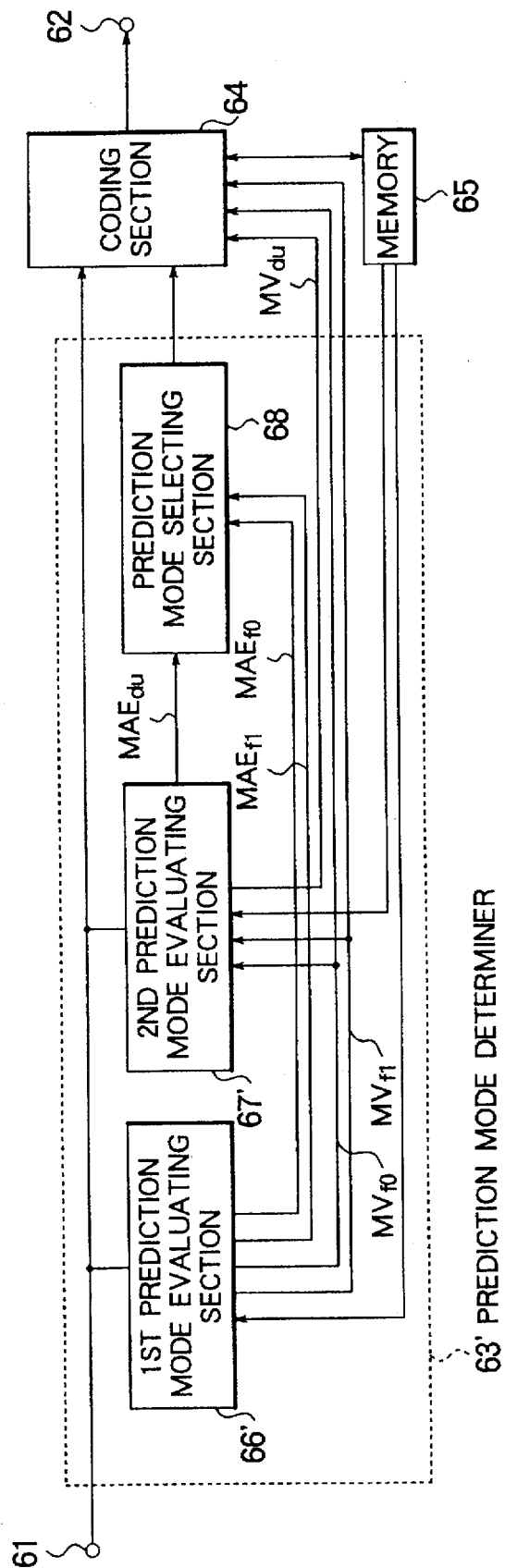
FIG. 9 is a block diagram of still another conventional moving picture coding device.

Referring to FIG. 9, still another conventional moving picture coding device will be described in order to facilitate an understanding of the present invention. The moving picture coding device has an input terminal 61 supplied with an input digital video signal. The moving picture coding device codes the input digital video signal in accordance with motion-compensated predictive coding into an output coded video signal. The moving picture coding device has an output terminal 62 for producing the output coded video signal.

The input digital video signal represents successive pictures which may be called frames or fields. Each of the successive pictures is divided into a predetermined number of blocks of picture elements (pixels). In the example being illustrated, each block consists of sixteen pixels by eight lines. At any rate, an input picture of the input digital video signal is supplied to the input terminal 41 by the block in coding processing order.

The moving picture coding device comprises another conventional prediction mode determiner 63', a coding section 64, and a memory 65. The prediction mode determiner 63' is supplied with the input digital video signal and a referenced picture from the input terminal 61 and the memory 65, respectively. The prediction mode determiner 63' is operable in first and second prediction mode groups for adaptive predictive coding. The first prediction mode group comprises a same-parity field prediction mode and a different-parity field prediction mode each of which refers to a signal field alone. The second prediction mode group comprises a dual-field prediction mode which refers to a plurality of fields.

The prediction mode determiner 63' carries out prediction mode determination for the adaptive predictive coding. The prediction mode determiner 63' comprises a first prediction mode evaluating section 66', a second prediction mode evaluating section 67', and a prediction mode selecting section 68. The first prediction mode evaluating section 66' evaluates the first prediction mode group in the manner which will later be described. The second prediction mode evaluating section 67' evaluates the second prediction mode group in the manner which will later be described.

The first prediction mode evaluating section 66' is supplied with the input picture of the input digital video signal from the input terminal 61. In addition, the first prediction mode evaluating section 66' is supplied with the referenced picture from the memory 65. The first prediction mode evaluating section 66' searches a same-parity field predicted motion vector $MV_{f0}$ and a different-parity field predicted motion vector $MV_{f1}$ with reference to the input picture and the referenced picture for each block. The first prediction mode evaluating section 66' supplies the same-parity field predicted motion vector $MV_{f0}$ and the different-parity field predicted motion vector $MV_{f1}$ to the second prediction mode evaluating section 67' and the coding section 64. In addition, the first prediction mode evaluating section 66' obtains a same-parity field prediction error evaluated value $MAE_{f0}$ and a different-parity field prediction error evaluated value $MAE_{f1}$ as well known in the art. In the example being illustrated, the same-parity field prediction error evaluated value $MAE_{f0}$ and the different-parity field prediction error evaluated value $MAE_{f1}$ are equal to a same-parity field mean absolute error and a different-parity field mean absolute error, respectively. The first prediction mode evaluating section 66' supplies the same-parity field prediction error evaluated value $MAE_{f0}$ and the different-parity field prediction error evaluated value $MAE_{f1}$ to the prediction mode selecting section 68.

The second prediction mode evaluating section 67' is supplied with the input picture of the input digital video signal and the referenced picture from the input terminal 61 and the memory 65, respectively. In addition, the second prediction mode evaluating section 67' is supplied with the same-parity field predicted motion vector $MV_{f0}$ and the different-parity field predicted motion vector $MV_{f1}$ from the first prediction mode evaluating section 66'. The second prediction mode evaluating section 67' searches a set of dual-field predicted motion vectors.

Figure 10:
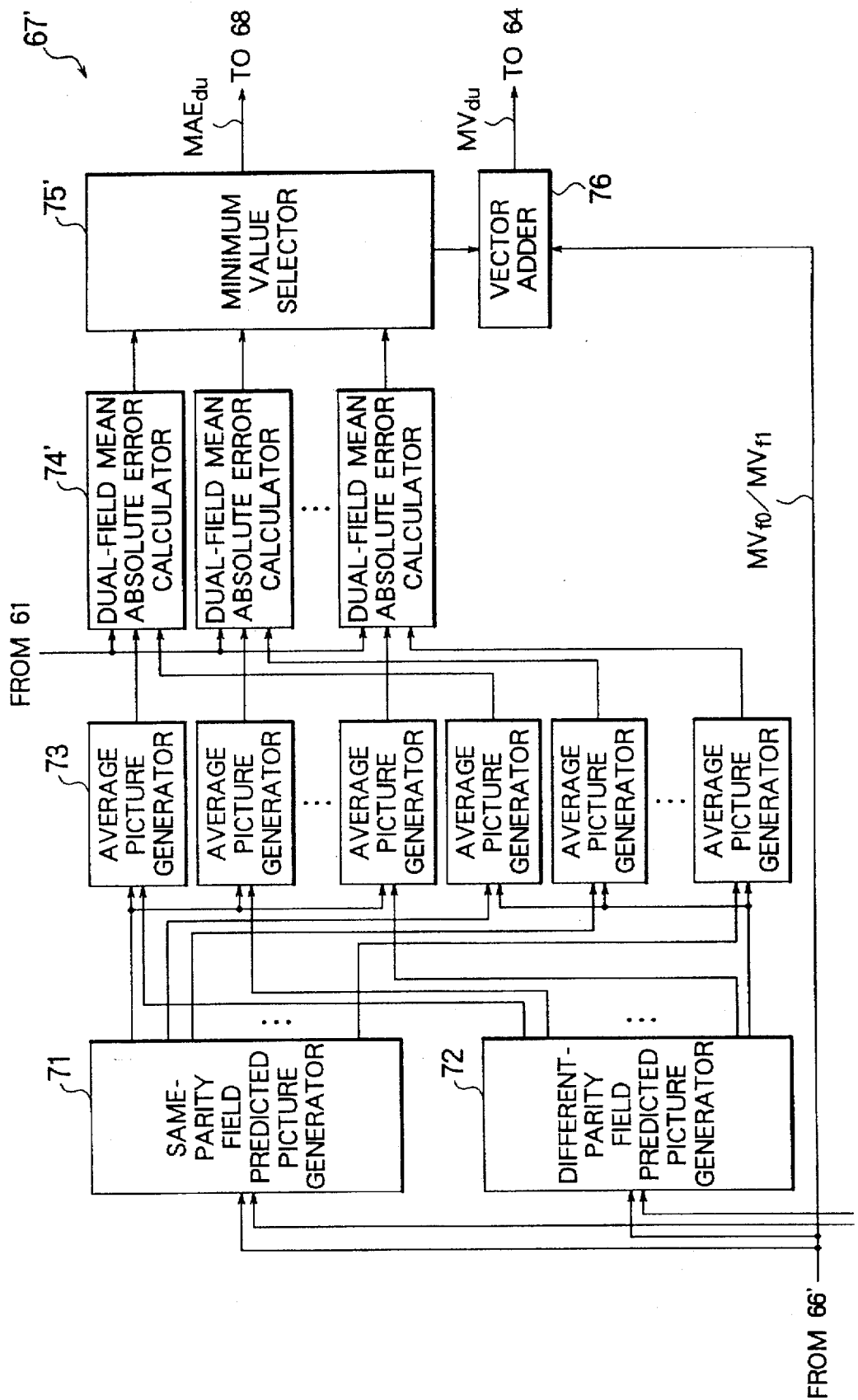
FIG. 10 is a block diagram of another conventional second prediction mode evaluating section for use in the conventional moving picture coding device illustrated in FIG. 9.

Turning to FIG. 10, the second prediction mode evaluating section 67' comprises a same-parity field predicted picture generator 71, a different-parity field predicted picture generator 72, eighteen average picture generators 73, nine dual-field mean absolute value calculators 74', a minimum value selector 75', and a vector adder 76.

The second prediction mode evaluating section 67' uses under restriction defined by the above-mentioned Equations (1) and (2), as a set of candidate differential motion vectors, eighteen differential motion vectors which comprise nine differential motion vectors for the same-parity field prediction and nine differential motion vectors for the different-parity field prediction. More specifically, the same-parity field predicted picture generator 71 generates nine same-parity field predicted pictures using the same-parity field predicted motion vector $MV_{f0}$ and the referenced picture. The different-parity field predicted picture generator 72 generates nine different-parity field predicted pictures using the different-parity field predicted motion vector $MV_{f1}$ and the referenced pictures. A combination of the eighteen average picture generators 73 generates eighteen dual-field predicted pictures using the nine same-parity field predicted pictures and the nine different-parity field predicted pictures. The eight dual-field mean absolute value calculators 74 calculate nine dual-field prediction error evaluated values by comparing the input picture with the eighteen dual-field predicted pictures. The minimum value selector 75' selects, as a set of optimum differential motion vectors, ones of the candidate differential motion vectors that have the minimum dual-field prediction error evaluated value $MAE_{du}$. The minimum value selector 75' supplies the minimum dual-field prediction error evaluated value MAEdu to the prediction mode selecting section 68 (FIG. 9). The vector adder 76 vector-adds a set of the same-parity field predicted motion vector $MV_{f0}$ and the different-parity field predicted motion vector $MV_{f1}$ to the set of the optimum differential motion vectors to produce a set of dual-field predicted motion vectors $MV_{du}$. The set of the dual-field predicted motion vectors $MV_{du}$ are supplied to the coding section 64 (FIG. 9).

Turning back to FIG. 9, the prediction mode selecting section 68 is supplied with the same-parity field prediction error evaluated value $MAE_{f0}$, the different-parity field prediction error evaluated value $MAE_{f1}$, and the minimum dual-field prediction error evaluated value $MAE_{du}$. The prediction mode selecting section 68 selects, as a selected prediction mode, one of the same-parity field prediction mode, the different-parity field prediction mode, and the dual-field prediction mode that has the minimum one among the same-parity field prediction error evaluated value $MAE_{f0}$, the different-parity field prediction error evaluated value $MAE_{f1}$, and the minimum dual-field prediction error evaluated value $MAE_{du}$. The prediction mode selecting section 68 supplies a selected prediction mode signal indicative of the selected prediction mode to the coding section 64.

The coding section 64 is supplied with the input picture of the input digital video signal, the selected prediction mode signal, the same-parity field predicted motion vector $MV_{f0}$, the different-parity field predicted motion vector $MV_{f1}$, and the set of the dual-field predicted motion vectors $MV_{du}$. The coding section 64 carries out motion-compensated predictive coding on the input picture using the same-parity field predicted motion vector $MV_{f0}$, the different-parity field predicted motion vector $MV_{f1}$, and the set of the dual-field predicted motion vectors $MV_{du}$ on the basis of the selected prediction mode to produce the output coded video signal. In addition, the coding section 64 obtains a local decoded picture using the output coded signal, the referenced picture, the selected prediction mode, the same-parity field predicted motion vector $MV_{f0}$, the different-parity field predicted motion vector $MV_{f1}$, and the set of the dual-field predicted motion vectors $MV_{du}$. The coding section 64 supplies the local decoded picture to the memory 65. The memory 65 stores the local decoded picture as the referenced picture.

As apparent from FIG. 10, the second prediction mode evaluating section 67' is complex in structure. As a result, the conventional prediction mode determiner 63' has a large circuitry scale.

(Principles of the Invention)

Description will be directed to principles of this invention. Attention will be at first directed to operation of motion-compensated prediction with half-pixel accuracy. The motion-compensated prediction with half-pixel accuracy carries out prediction of a pixel value in a position (x, y) in a current frame by using a motion vector (vx, vy) in accordance with a coded past frame $p_{past}(x, y)$. It is assumed that the motion vector (vx, vy) is equal to (+2.5, +1). In this event, a predicted value $\tilde{p}(x, y, vx, vy)$ obtained by the motion-compensated prediction with half-pixel accuracy is represented as follows:

$$\tilde{p}(x,y,+2.5,+1) = \frac{1}{2} \{p_{past}(x+2, y+1) + p_{past}(x+3, y+1)\} \quad (3)$$

$$= \frac{1}{2} \{\tilde{p}(x,y,+2,+1) + \tilde{p}(x,y,+3,+1)\} \quad (4)$$

That is, the predicted valued $\tilde{p}(x, y, vx, vy)$ is a mean value of predicted values obtained by motion-compensated prediction with full pixel accuracy. In other words, the motion-compensated prediction with half-pixel accuracy is simple average prediction of the motion-compensated prediction with full pixel accuracy.

Attention will be directed to operation of interpolative prediction. The interpolative prediction carries out prediction of an interpolative predicted value $\tilde{p}_{intp}(x, y, fvx, fvy, bvx, bvy)$ by using a motion vector (fvx, fvy) in the past and a motion vector (bvx, bvy) in the future. The interpolative predicted value $p\tilde{p}_{intp}(x, y, fvx, fvy, bvx, bvy)$ is a mean value of a forward predicted value $\tilde{p}_{fwd}(x, y, fvx, fvy)$ obtained by forward prediction and a backward predicted value $\tilde{p}_{bwd}(x, y, bvx, bvy)$ obtained by backward prediction. That is:

$$\tilde{p}_{intp}(x,y,fvx,fvy,bvx,bvy) = \frac{1}{2}\{\tilde{p}_{fwd}(x,y,fvx,fvy) + \tilde{p}_{bwd}(x,y,bvx,bvy)\}. \quad (5)$$

As apparent from the above-mentioned Equation (5), the interpolative prediction is simple average prediction of the forward prediction and the backward prediction.

Attention will be directed to operation of dual-field prediction. The dual-field prediction carries out prediction of a dual-field predicted value $\tilde{p}_{dual}(x, y, f0x, f0y, f1x, f1y)$ by using a motion vector (f0x, f0y) in a same-parity field in the past and a motion vector (f1x, f1y) in a different-parity field in the past. The dual-field predicted value $\tilde{p}_{dual}(x, y, f0x, f0y, f1x, f1y)$ is a mean value of a same-parity predicted value $\tilde{p}_0(x, y, f0x, f0y)$ obtained by same-parity field prediction and a different-parity predicted value $\tilde{p}_1(x, y, f1x, f1y)$ obtained by different-parity field prediction. That is:

$$\tilde{p}_{dual}(x,y,f0x,f0y,f1x,f1y) = \frac{1}{2}\{\tilde{p}_0(x,y,f0x,f0y) + \tilde{p}_1(x,y,f1x,f1y)\}. \quad (6)$$

As apparent from the above-mentioned Equation (6), the dual-field prediction is simple average prediction of the same-parity field prediction and the different-parity field prediction.

Attention will be directed to the relationship between a prediction error in the average prediction and two prediction errors in two predictions for use in the average prediction. It is assumed that the average predicted value $\tilde{p}(x, y)$ in the average prediction is a mean value of a first predicted value $\tilde{p}_1(x, y)$ and a second predicted value $\tilde{p}_2(x, y)$. In this event, the average predicted value $\tilde{p}(x, y)$, the first predicted value $\tilde{p}_1(x, y)$, and the second predicted value $\tilde{p}_2(x, y)$ are represented by using a true pixel value $p(x, y)$, a first prediction error $e_1(x, y)$ for the first predicted value $\tilde{p}_1(x, y)$, and a second prediction error $e_2(x, y)$ for the second predicted value $\tilde{p}_2(x, y)$ as follows:

$$\tilde{p}_1(x,y) = p(x,y) + e_1(x,y), \quad (7)$$
$$\tilde{p}_2(x,y) = p(x,y) + e_2(x,y), \quad (8)$$

and $$\tilde{p}(x,y) = \frac{1}{2}\{\tilde{p}_1(x,y) + \tilde{p}_2(x,y)\} \quad (9)$$

$$= p(x,y) + \frac{1}{2}\{e_1(x,y) + e_2(x,y)\}. \quad (10)$$

In general, a mean square error (MSE) or a mean absolute error (MAE) is used as a prediction error evaluated value. The first predicted value $\tilde{p}_1$, the second predicted value $\tilde{p}_2$, and the average predicted value $\tilde{p}$ have mean square errors MSE $(\tilde{p}_1)$, MSE $(\tilde{p}_2)$, and MSE $(\tilde{p})$, respectively, which are represented by:

$$MSE(\tilde{p}_1) = \overline{\{\tilde{p}_1(x,y) - p(x,y)\}^2} \quad (11)$$

$$= \overline{e_1(x,y)^2}, \quad (12)$$

$$MSE(\tilde{p}_2) = \overline{e_2(x,y)^2}, \quad (13)$$

$$MSE(\tilde{p}) = \frac{1}{4}\overline{\{e_1(x,y) + e_2(x,y)\}^2} \quad (14)$$

$$= \frac{1}{4}\overline{e_1(x,y)^2 + e_2(x,y)^2 + 2e_1(x,y)e_2(x,y)} \quad (15)$$

$$= \frac{1}{4}\{MSE(\tilde{p}_1) + MSE(\tilde{p}_2) + \overline{2e_1(x,y)e_2(x,y)}\} \quad (16)$$

$$= \frac{1}{4}\{MSE(\tilde{p}_1) + MSE(\tilde{p}_2) + 2\rho\sqrt{MSE(\tilde{p}_1)MSE(\tilde{p}_2)}\}, \quad (17)$$

and $$\rho = \frac{\overline{e_1(x,y)e_2(x,y)}}{\sqrt{\overline{e_1(x,y)^2} \cdot \overline{e_2(x,y)^2}}}, \quad (18)$$

where $\rho$ represents a correlation coefficient for the prediction error. As apparent from the above-mentioned Equations, the mean square error MSE($\tilde{p}$) of the average predicted value $\tilde{p}$ depends upon the correlation coefficient $\rho$ for the prediction error.

Inasmuch as a geometrical mean is not more than an arithmetical mean, the following Equations hold:

$$\sqrt{MSE(\tilde{p}_1)MSE(\tilde{p}_2)} \leq \frac{1}{2}\{MSE(\tilde{p}_1) + MSE(\tilde{p}_2)\}, \quad (19)$$

and $$MSE(\tilde{p}) \leq \quad (20)$$
$$\frac{1}{4}\left\{MSE(\tilde{p}_1) + MSE(\tilde{p}_2) + 2\rho\frac{1}{2}\{MSE(\tilde{p}_1) + MSE(\tilde{p}_2)\}\right\}$$

$$\leq \frac{1+\rho}{4}\{MSE(\tilde{p}_1) + MSE(\tilde{p}_2)\}. \quad (21)$$

Condition for the sign of equality is as follows:

$$e_1(x,y) = e_2(x,y).$$

Similar Equations are satisfied in the mean absolute error (MAE). The first predicted value $\tilde{p}_1$, the second predicted value $\tilde{p}_2$, and the average predicted value $\tilde{p}$ have mean absolute errors MAE($\tilde{p}_1$), MAE($\tilde{p}_2$), and MAE($\tilde{p}$), respectively, which are represented by:

$$MAE(\tilde{p}_1) = \overline{|\tilde{p}_1(x,y) - p(x,y)|} \quad (22)$$

$$= \overline{|e_1(x,y)|}, \quad (23)$$

$$MAE(\tilde{p}_2) = \overline{|e_2(x,y)|}, \quad (24)$$

and $$MAE(\tilde{p}) = \overline{\left|\frac{1}{2}\{e_1(x,y) + e_2(x,y)\}\right|} \quad (25)$$

$$= \frac{1}{2}\overline{|e_1(x,y) + e_2(x,y)|} \quad (26)$$

$$\leq \frac{1}{2}\{MAE(\tilde{p}_1) + MAE(\tilde{p}_2)\}. \quad (27)$$

Condition for the sign of equality is as follows:

$$e_1(x,y)e_2(x,y) \geq 0 (\forall_{x,y})$$

As described above, it is understood that the prediction error evaluated value for the average prediction is not more than a half of a sum of two prediction error evaluated values of two predictions for use in the average prediction on using either the mean square error (MSE) or the mean absolute error (MAE). The present inventor measured the relationship between the average predicted value p(x,y) and the first and the second predicted values $p_1$ and $p_2$. As a result, the present inventor confirmed that the prediction error evaluated value for the average prediction is estimated by using a suitable coefficient as follows:

$$MSE(\tilde{p}) \equiv \alpha \{MSE(\tilde{p}_1) + MSE(\tilde{p}_2)\}, \quad (28)$$

and $$MAE(\tilde{p}) \equiv \beta \{MAE(\tilde{p}_1) + MAE(\tilde{p}_2)\}, \quad (29)$$

where coefficients $\alpha$ and $\beta$ depend on a bit rate, a coding objective picture, and so on.

For example, in a two-stage motion vector searcher for searching a first motion vector with full pixel accuracy in a first stage and for searching a second motion vector with half-pixel accuracy in a second stage, a mean absolute error $MAE(\tilde{p})$ for the second motion vector is estimated by substituting $\beta=0.375$ in the above-mentioned Equation (29) with mean absolute errors $MAE(\tilde{p}_1)$ and $MAE(\tilde{p}_2)$ for the first motion vector. As a result, it is possible to search the second motion vector without generation of motion-compensated predicted pictures.

In a prediction mode determiner for carrying out motion vector search of forward prediction and backward prediction in a first stage to calculate mean absolute errors $MAE(\tilde{p}_1)$ and $MAE(\tilde{p}_2)$ for the forward prediction and the backward prediction and for calculating a mean absolute error $MAE(\tilde{p})$ for interpolative prediction in a second stage, the mean absolute error $MAE(\tilde{p})$ for interpolative prediction is estimated by substituting $\beta=0.4375$ in the above-mentioned Equation (29) with the mean absolute errors $MAE(\tilde{p}_1)$ and $MAE(\tilde{p}_2)$ for the forward prediction and the backward prediction. As a result, it is possible in the prediction mode determiner to determine a prediction mode without generation of interpolative predicted pictures.

(Embodiments)

Figure 11:
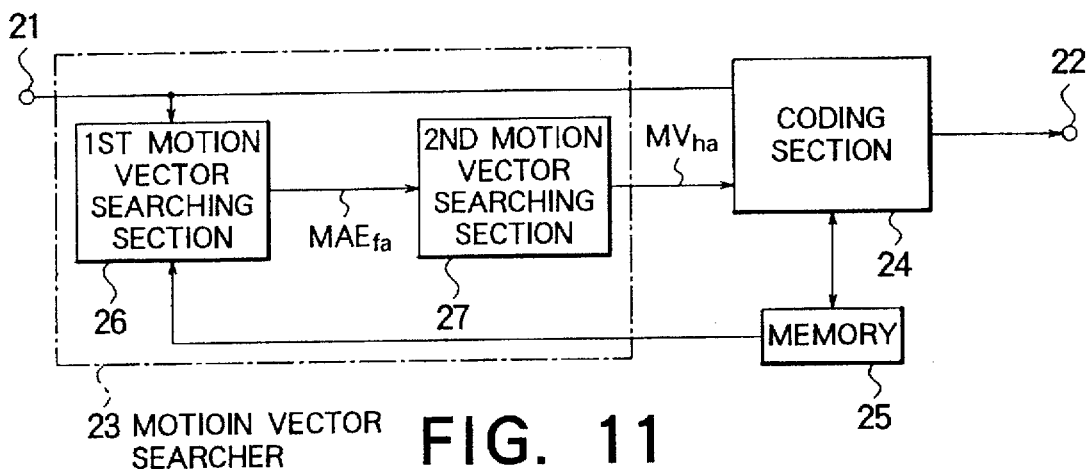
FIG. 11 is a block diagram of a moving picture coding device according to a first embodiment of this invention.

Referring to FIG. 11, a moving picture coding device according to a first embodiment of this invention is similar in structure to that in FIG. 1 except that the motion vector searcher is modified to be different from that described in conjunction with FIG. 1 as will later become clear. The motion vector searcher is therefore depicted at 23.

The motion vector searcher 23 comprises a first motion vector searching section 26 and a second motion vector searching section 27. The first motion vector searching section 26 generates a plurality of primary motion-compensated predictive pictures for respective primary candidate vectors between the vector search range (±14, ±7) for each block. Each primary motion-compensated predictive picture is a motion-compensated predictive picture with full pixel accuracy. Each primary candidate vector is a candidate vector with full pixel accuracy. The first motion vector searching section 26 calculates a plurality of primary prediction error evaluated values $MAE_{fa}$ by comparing the input block with the primary motion-compensated predictive pictures. Each primary prediction error evaluated value is a prediction error evaluated value with full pixel accuracy. In the example being illustrated, each primary prediction error evaluated value $MAE_{fa}$ represents a mean absolute error. The first motion vector searching section 26 supplies all of the primary prediction error evaluated value $MAE_{fa}$ to the second motion vector searching section 27.

Figure 12:
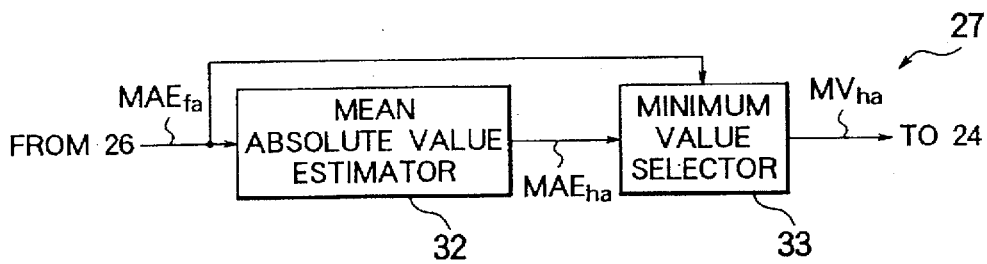
FIG. 12 is a block diagram of a second motion vector searching section for use in the moving picture coding device illustrated in FIG. 11.

Turning to FIG. 12, the second motion vector searching section 27 comprises a mean absolute value estimator 32 and a minimum value selector 33.

The mean absolute value estimator 32 estimates a plurality of subsidiary prediction error evaluated values for subsidiary candidate vectors using the primary prediction error evaluated values $MAE_{fa}$ within the vector search range (±14, ±7) for each block. Each subsidiary prediction error evaluated value is a prediction error evaluated value with half-pixel accuracy. Each subsidiary candidate vector is a candidate vector with half-pixel accuracy. The subsidiary candidate vectors are classified into three types. A first type of subsidiary candidate vectors are candidate vectors with half-pixel accuracy in a horizontal direction alone. A second type of subsidiary candidate vectors are candidate vectors with half-pixel accuracy in a vertical direction alone. A third type of subsidiary candidate vectors are candidate vectors with half-pixel accuracy in both the horizontal direction and the vertical direction. The first type of subsidiary candidate vectors have the subsidiary prediction error evaluated values each of which is obtained by multiplying 0.375 by a sum of two primary prediction error evaluated values for two adjacent primary candidate vectors in the horizontal direction. The second type of subsidiary candidate vectors have the subsidiary prediction error evaluated values each of which is obtained by multiplying 0.375 by a sum of two primary prediction error evaluated values for two adjacent primary candidate vectors in the vertical direction. The third type of subsidiary candidate vectors have the subsidiary prediction error evaluated values each of which is obtained by multiplying 0.171875 by a sum of four primary prediction error evaluated values for four adjacent primary candidate vectors in both the horizontal direction and the vertical direction.

The minimum value selector 33 is supplied with the primary prediction error evaluated values $MAE_{fa}$ and the subsidiary prediction error evaluated values $MAE_{ha}$. The minimum value selector 33 selects, as a subsidiary motion vector $MV_{ha}$, one of the primary candidate vectors and the subsidiary candidate vectors that has the minimum one in the primary prediction error evaluated values $MAE_{fa}$ and the subsidiary prediction error evaluated values $MAE_{ha}$. The minimum value selector 33 supplies the subsidiary motion vector $MV_{ha}$ to the coding section 24 (FIG. 11). The subsidiary motion vector $MV_{ha}$ is a motion vector with half-pixel accuracy.

As apparent from FIG. 12, the motion vector searcher 23 comprises the second motion vector searching section 27 which is simple in structure in comparison with the conventional second motion vector searching section 27' illustrated in FIG. 2.

Figure 13:
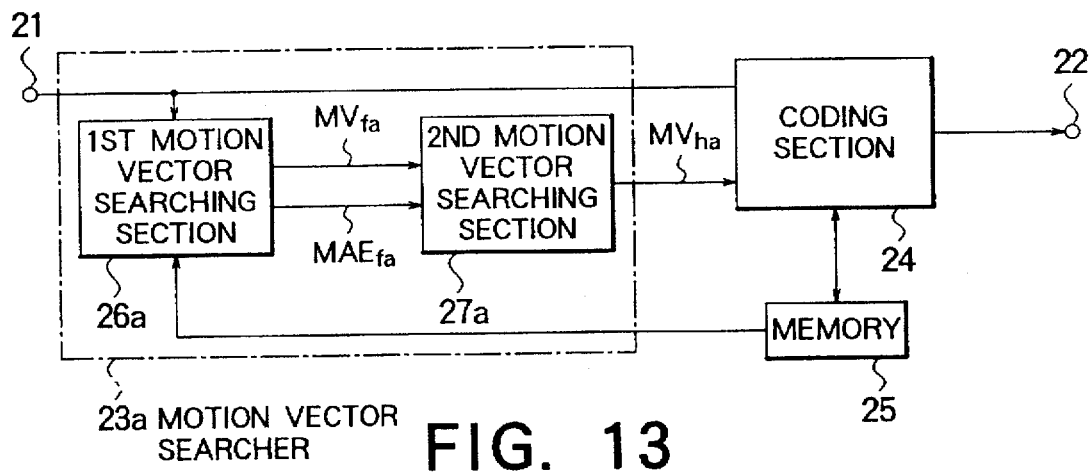
FIG. 13 is a block diagram of a moving picture coding device according to a second embodiment of this invention.

Referring to FIG. 13, a moving picture coding device according to a second embodiment of this invention is similar in structure to that in FIG. 11 except that the motion vector searcher is modified to be different from that described in conjunction with FIG. 11 as will later become clear. The motion vector searcher is therefore depicted at 23a.

The motion vector searcher 23a comprises a first motion vector searching section 26a and a second motion vector searching section 27a. The first motion vector searching section 26a generates a plurality of primary motion-compensated predictive pictures for respective primary candidate vectors within the vector search range (±14, ±7) for each block. Each primary motion-compensated predictive picture is a motion-compensated predictive picture with full pixel accuracy. Each primary candidate vector is a candidate vector with full pixel accuracy. The first motion vector searching section 26a calculates a plurality of primary prediction error evaluated values by comparing the input block with the primary motion-compensated predictive pictures. Each primary prediction error evaluated value is a prediction error evaluated value with full pixel accuracy. In the example being illustrated, each primary prediction error evaluated value represents a mean absolute error. The first motion vector searching section 26a supplies the second motion vector searching section 27a with a primary motion vector $MV_{fa}$ having the minimum one among the primary prediction error evaluated values. The primary motion vector $MV_{fa}$ is a motion vector with full pixel accuracy. In addition, the first motion vector searching section 26a supplies the second motion vector searching section 27a with nine primary prediction error evaluated values $MAE_{fa}$ for nine respective primary candidate vectors within a full pixel range (±1, ±1) of the primary motion vector $MV_{fa}$.

Figure 14:
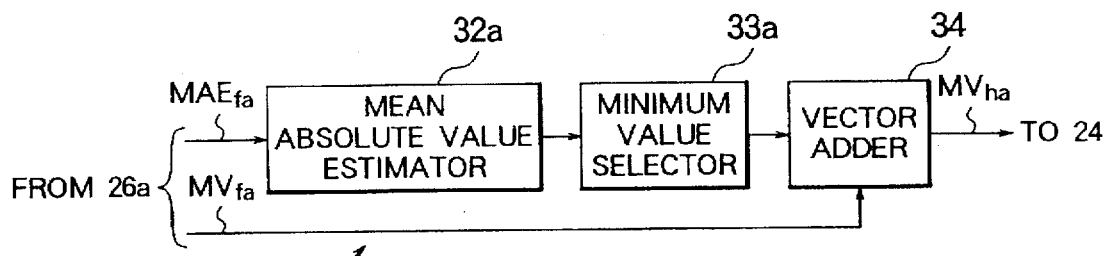
FIG. 14 is a block diagram of another second motion vector searching section for use in the moving picture coding device illustrated in FIG. 13.

Turning to FIG. 14, the second motion vector searching section 27a comprises a mean absolute value estimator 32a, a minimum value selector 33a, and the vector adder 34.

The mean absolute value estimator 32a estimates eight neighboring subsidiary prediction error evaluated values for eight neighboring candidate differential vectors within a half pixel range (±0.5, ±0.5) of the primary motion vector $MV_{fa}$ using the nine primary prediction error evaluated values for each block. Each subsidiary prediction error evaluated value is a prediction error evaluated value with half-pixel accuracy. The eight neighboring candidate differential vectors are classified into three types. A first type of two neighboring candidate differential vectors are two candidate differential vectors in a horizontal direction alone. A second type of two neighboring candidate differential vectors are two candidate differential vectors in a vertical direction alone. A third type of four neighboring candidate differential vectors are four candidate differential vectors in both the horizontal direction and the vertical direction.

The first type of two neighboring candidate differential vectors have two subsidiary prediction error evaluated values each of which is obtained by multiplying 0.375 by a sum of two primary prediction error evaluated values for two adjacent primary candidate vectors in the horizontal direction. The second type of two neighboring candidate differential vectors have two subsidiary prediction error evaluated values each of which is obtained by multiplying 0.375 by a sum of two primary prediction error evaluated values for two adjacent primary candidate vectors in the vertical direction. The third type of four neighboring candidate differential vectors have four subsidiary prediction error evaluated values each of which is obtained by multiplying 0.171875 by a sum of four primary prediction error evaluated values for four adjacent primary candidate vectors in both the horizontal direction and the vertical direction.

The minimum value selector 33a is supplied with the eight neighboring subsidiary prediction error evaluated values and the minimum primary prediction error evaluated value. The minimum value selector 33a selects, as a selected candidate differential vector, one of the primary motion vector and the eight neighboring candidate differential vectors that has the minimum primary prediction error evaluated value and the eight neighboring subsidiary prediction error evaluated values. The minimum value selector 33a supplies the selected candidate differential vector to the vector adder 34. The vector adder 34 vector-adds the primary motion vector $MV_{fa}$ with the selected candidate differential vector to produce the subsidiary motion vector $MV_{ha}$. The subsidiary motion vector $MV_{ha}$ is supplied to the coding section 24 (FIG. 13). The subsidiary motion vector $MV_{ha}$ is a motion vector with half-pixel accuracy.

As apparent from FIG. 14, the motion vector searcher 23a comprises the second motion vector searching section 27a which is simple in structure in comparison with the conventional second motion vector searching section 27' illustrated in FIG. 2.

Figure 15:
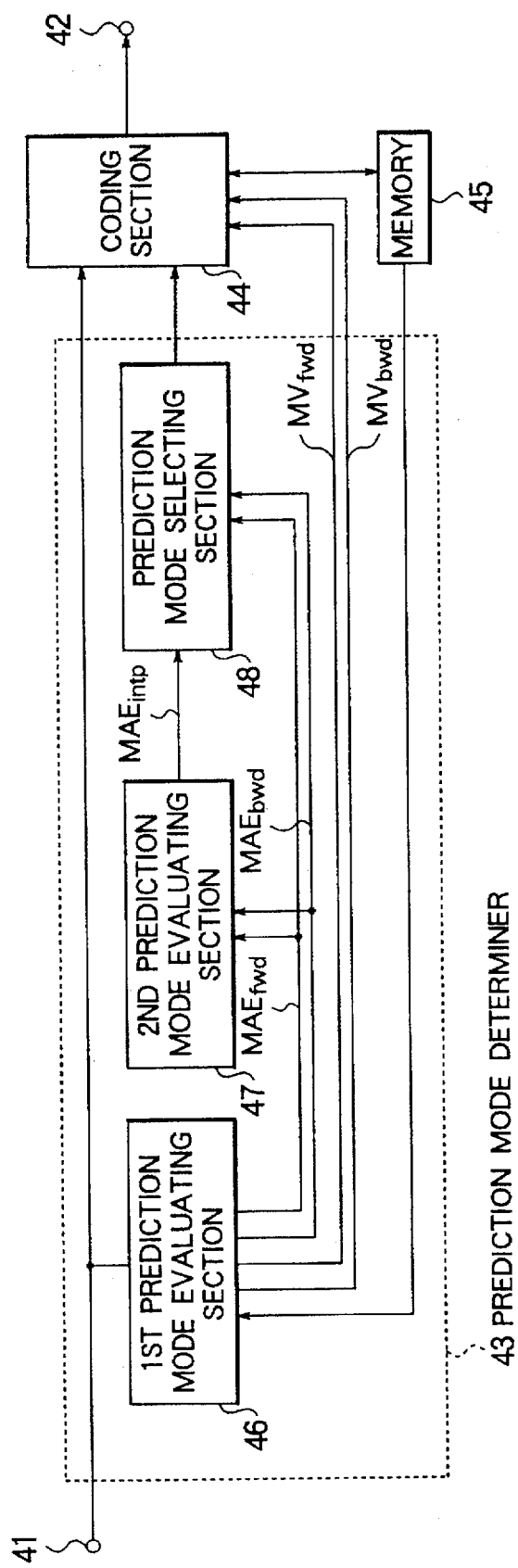
FIG. 15 is a block diagram of a moving picture coding device according to a third embodiment of this invention.

Referring to FIG. 15, a moving picture coding device according to a third embodiment of this invention is similar in structure to that in FIG. 7 except that the prediction mode determiner is modified to be different from that described in conjunction with FIG. 7 as will later become clear. The prediction mode determiner is therefore depicted at 43.

The prediction mode determiner 43 is similar in structure to the prediction mode determiner 43' in FIG. 7 except that the second prediction mode evaluating section is modified to be different from that described in conjunction with FIG. 7 as will later become clear. The second prediction mode evaluating section is therefore depicted at 47.

Figure 16:
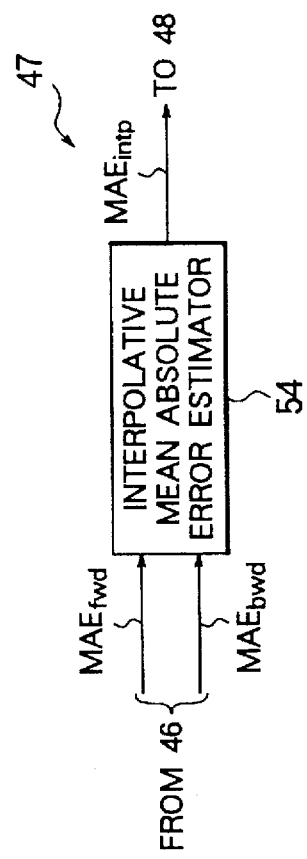
FIG. 16 is a block diagram of a second prediction mode evaluating section for use in the moving picture coding device illustrated in FIG. 15.

Turning to FIG. 16, the second prediction mode evaluating section 47 is supplied with the forward prediction error evaluated value $MAE_{fwd}$ and the backward prediction error evaluated value $MAE_{bwd}$ from the first prediction mode evaluating section 46. The second prediction mode evaluating section 47 comprises an interpolative mean absolute value estimator 54. The mean absolute value estimator 54 estimates the interpolative prediction error evaluated value $MAE_{intp}$ using the forward prediction error evaluated value $MAE_{fwd}$ and the backward prediction error evaluated value $MAE_{bwd}$. In the example being illustrated, the interpolative prediction error evaluated value $MAE_{intp}$ is equal to a value which is obtained by multiplying 0.4375 by a sum of the forward prediction error evaluated value $MAE_{fwd}$ and the backward prediction error evaluated value $MAE_{bwd}$.

As apparent from FIG. 16, the prediction mode determiner 43 comprises the second prediction mode evaluating section 47 which is simple in structure in comparison with the conventional second prediction mode evaluating section 47' illustrated in FIG. 8.

Figure 17:
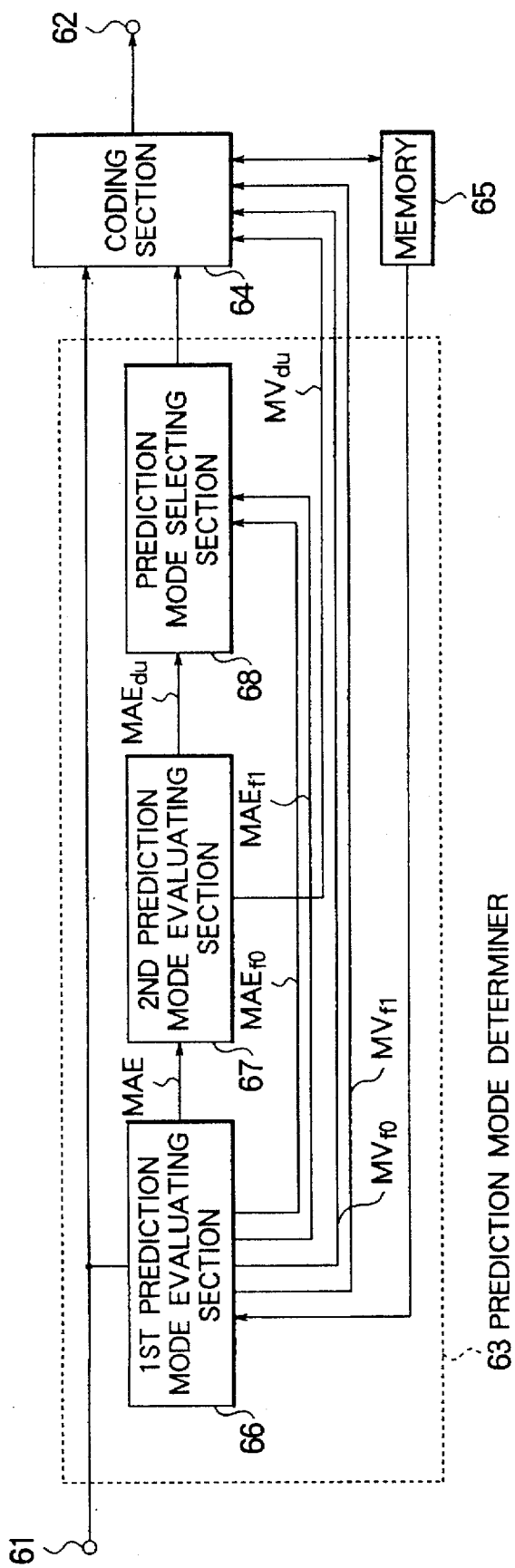
FIG. 17 is a block diagram of a moving picture coding device according to a fourth embodiment of this invention.

Referring to FIG. 17, a moving picture coding device according to a fourth embodiment of this invention is similar in structure to that in FIG. 9 except that the prediction mode determiner is modified to be different from that described in conjunction with FIG. 9 as will later become clear. The prediction mode determiner is therefore depicted at 63. The prediction mode determiner 63 comprises a first prediction mode evaluating section 66, a second prediction mode evaluating section 67, and the prediction mode selecting section 68.

The first prediction mode evaluating section 66 is supplied with the input picture of the input digital video signal and the referenced picture from the input terminal 61 and the memory 65, respectively. The first prediction mode evaluating section 66 searches the same-parity field predicted motion vector $MV_{f0}$ and the different-parity field predicted motion vector $MF_{f1}$ with reference to the input picture and the referenced picture for each block. The first prediction mode evaluating section 66 supplies the same-parity field predicted motion vector $MV_{f0}$ and the different-parity field predicted motion vector $MV_{f1}$ to the coding section 64. In the manner which is known in the art, the first prediction mode evaluating section 66 obtains primary prediction error evaluated values MAE which are classified into same-parity field prediction error evaluated values and different-parity field prediction error evaluated values. In the example being illustrated, each same-parity field prediction error evaluated value and each different-parity field prediction error evaluated value are equal to a same-parity field mean absolute error and a different-parity field mean absolute error, respectively.

The first prediction mode evaluating section 66 supplies the minimum same-parity field prediction error evaluated value $MAE_{f0}$ and the minimum different-parity field prediction error evaluated value $MAE_{f1}$ to the prediction mode selecting section 68. In addition, the first prediction mode evaluating section 66 supplies all of the primary prediction error evaluated values MAE to the second prediction mode evaluating section 67.

The second prediction mode evaluating section 67 searches sets of dual-field predicted motion vectors for each block. The second prediction mode evaluating section 67 uses, as sets of subsidiary candidate motion vectors, all of the candidate motion vectors under restriction defined by the above-mentioned Equations (1) and (2).

Figure 18:
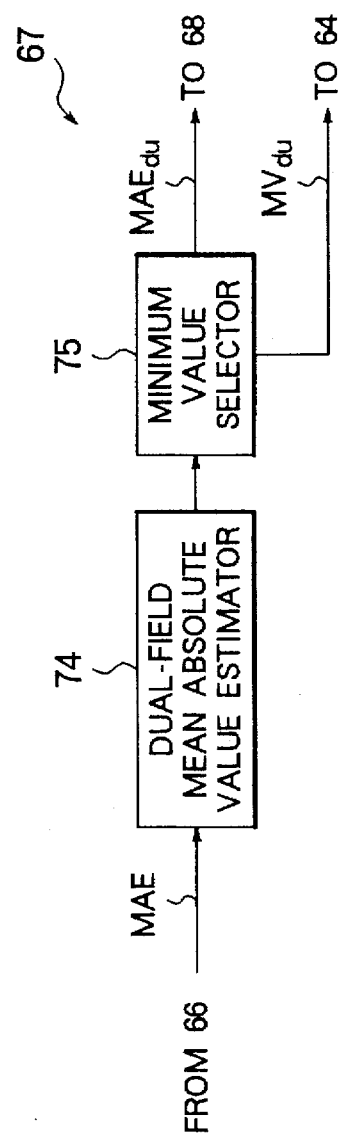
FIG. 18 is a block diagram of another second prediction mode evaluating section for use in the moving picture coding device illustrated in FIG. 17.

Turning to FIG. 18, the second prediction mode evaluating section 67 comprises a dual-field mean absolute value estimator 74 and a minimum value selector 75. The dual-field mean absolute value estimator 74 estimates dual-field prediction error evaluated values using the primary prediction error evaluated values MAE. In the example being illustrated, each dual-field prediction error evaluated value is equal to a value which is obtained by multiplying 0.4375 by a sum of the corresponding same-parity field prediction error evaluated value and the corresponding different-parity field prediction error evaluated value. The minimum value selector 75 selects, as a set of dual-field predicted motion vectors $MV_{du}$, one set of the subsidiary candidate motion vectors that have the minimum dual-field prediction error evaluated value $MAE_{du}$. The minimum value selector 75 supplies the set of the dual-field predicted motion vectors $MV_{du}$ to the coding section 64 (FIG. 17). The minimum value selector 75 supplies the minimum dual-field prediction error evaluated value $MAE_{du}$ to the prediction mode selecting section 68 (FIG. 17).

As apparent from FIG. 18, the prediction mode determiner 63 comprises the second prediction mode evaluating section 67 which is simple in structure in comparison with the conventional second prediction mode evaluating section 67' illustrated in FIG. 10.

Figure 19:
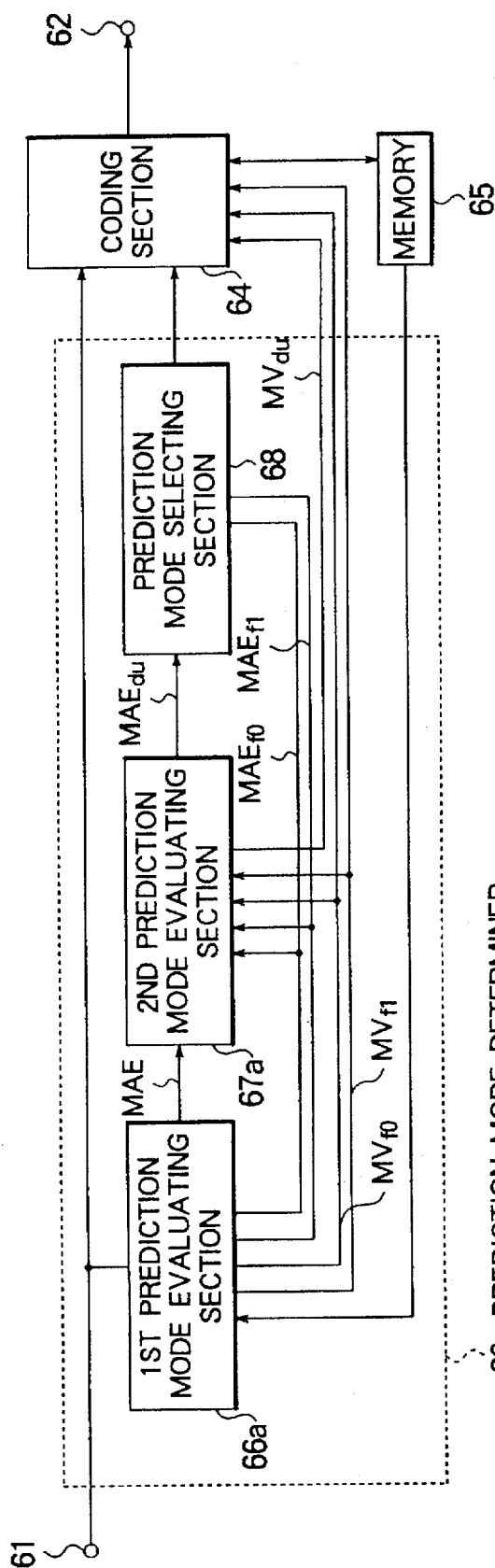
FIG. 19 is a block diagram of a moving picture coding device according to a fifth embodiment of this invention.

Referring to FIG. 19, a moving picture coding device according to a fifth embodiment of this invention is similar in structure to that in FIG. 9 except that the prediction mode determiner is modified to be different from that described in conjunction with FIG. 9 as will later become clear. The prediction mode determiner is therefore depicted at 63a. The prediction mode determiner 63a comprises a first prediction mode evaluating section 66a, a second prediction mode evaluating section 67a, and the prediction mode selecting section 68.

The first prediction mode evaluating section 66a is supplied with the input picture of the input digital video signal and the referenced picture from the input terminal 61 and the memory 65, respectively. The first prediction mode evaluating section 66a searches the same-parity field predicted motion vector $MV_{f0}$ and the different-parity field predicted motion vector $MV_{f1}$ with reference to the input picture and the referenced picture for each block. The first prediction mode evaluating section 66a supplies the same-parity field predicted motion vector $MV_{f0}$ and the different-parity field predicted motion vector $MV_{f1}$ to the coding section 64 and the second prediction mode evaluating section 67a. In the manner which is known in the art, the first prediction mode evaluating section 66a obtains primary prediction error evaluated values MAE which are classified into same-parity field prediction error evaluated values and different-parity field prediction error evaluated values. In the example being illustrated, each same-parity field prediction error evaluated value and each different-parity field prediction error evaluated value are equal to a same-parity field mean absolute error and a different-parity field mean absolute error, respectively.

The first prediction mode evaluating section 66a supplies the minimum same-parity field prediction error evaluated value $MAE_{f0}$ and the minimum different-parity field prediction error evaluated value $MAE_{f1}$ to the prediction mode selecting section 68. In addition, the first prediction mode evaluating section 66a supplies the second prediction mode evaluating section 67a with the minimum same-parity field prediction error evaluated value $MAE_{f0}$ and the minimum different-parity field prediction error evaluated value $MAE_{f1}$. Furthermore, the first prediction mode evaluating section 66a supplies the second prediction mode evaluating section 67a with sixteen primary prediction error evaluated values MAE which comprise eight neighboring same-parity field prediction error evaluated values of the minimum same-parity field prediction error evaluated value $MAE_{f0}$ and eight neighboring different-parity field prediction error evaluated values of the minimum different-parity field prediction error evaluated value $MAE_{f1}$.

The second prediction mode evaluating section 67a searches a set of dual-field predicted motion vectors using the sixteen primary prediction error evaluated values MAE, the minimum same-parity field prediction error evaluated value $MAE_{f0}$, the minimum different-parity field prediction error evaluated value $MAE_{f1}$, the same-parity field predicted motion vector $MV_{f0}$, and the different-parity field predicted motion vector $MV_{f1}$. The second prediction mode evaluating section 67a uses, under restriction defined by the above-mentioned Equations (1) and (2), as a set of eighteen subsidiary candidate motion vectors, eighteen candidate motion vectors corresponding to the sixteen primary prediction error evaluated values MAE, the minimum same-parity field prediction error evaluated value $MAE_{f0}$, and the minimum different-parity field prediction error evaluated value $MAE_{f1}$.

Figure 20:
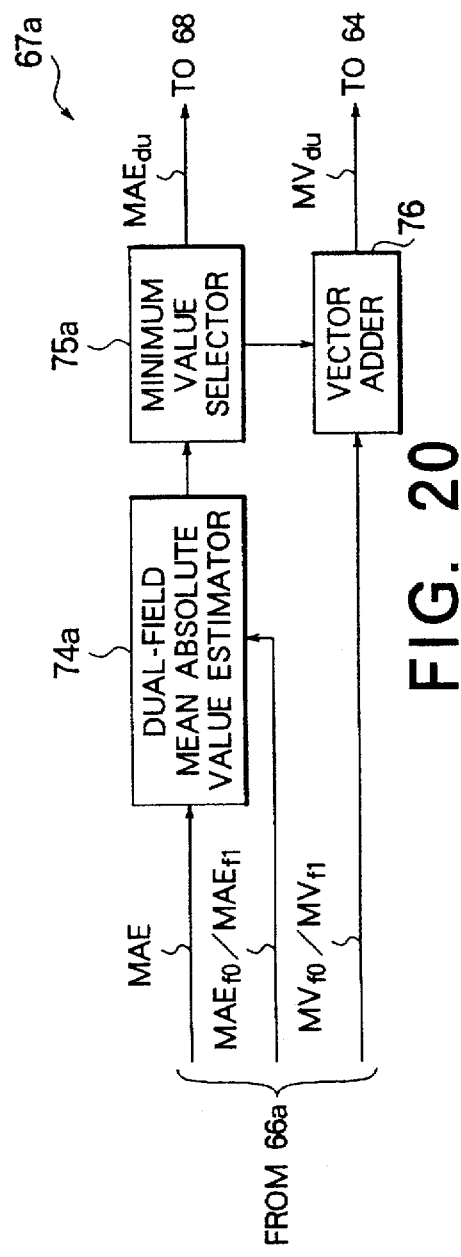
FIG. 20 is a block diagram of still another second prediction mode evaluating section for use in the moving picture coding device illustrated in FIG. 19.

Turning to FIG. 20, the second motion vector searching section 67a comprises a dual-field mean absolute value estimator 74a, a minimum value selector 75a, and the vector adder 76.

The dual-field mean absolute value estimator 74a estimates nine dual-field prediction error evaluated values for nine candidate differential vectors using the sixteen primary prediction error evaluated values MAE, the minimum same-parity field prediction error evaluated value $MAE_{f0}$, and the minimum different-parity field prediction error evaluated value $MAE_{f1}$. In the example being illustrated, each dual-field prediction error evaluated value is equal to a value which is obtained by multiplying 0.4375 by a sum of the corresponding same-parity field prediction error evaluated value and the corresponding different-parity field prediction error evaluated value.

The minimum value selector 75a is supplied with the nine dual-field prediction error evaluated values for the nine candidate differential vectors. The minimum value selector 75a selects, as a set of optimum candidate differential vectors, one of the candidate differential vectors that have the minimum dual-field prediction error evaluated value $MAE_{du}$. The minimum value selector 75a supplies the minimum dual-field prediction error evaluated value $MAE_{du}$ to the prediction mode selecting section 68 (FIG. 19). The minimum value selector 75a supplies the set of the optimum candidate differential vectors to the vector adder 76. The vector adder 76 vector-adds a set of the same-parity field predicted motion vector $MV_{f0}$ and the different-parity field predicted motion vector $MV_{f1}$ to the set of the optimum candidate differential vectors to produce a set of dual-field predicted motion vectors $MV_{du}$. The set of the dual-field predicted motion vectors $MV_{du}$ are supplied to the coding section 64 (FIG. 19).

As apparent from FIG. 20, the prediction mode determiner 63a comprises the second prediction mode evaluating section 67a which is simple in structure in comparison with the conventional second prediction mode evaluating section 67' illustrated in FIG. 10.

While this invention has thus far been described in conjunction with the embodiments thereof, it will now be readily possible for those skilled in the art to put this invention into practice in various For e manners. For example, the second motion vector searching section 27a in FIG. 13 may use, as a neighboring search object, four neighboring subsidiary candidate vectors within a range of a half-pixel apart from the primary motion vector in horizontal or vertical directions.

What is claimed is:

1. A motion vector search device for use in a moving picture coding device including a memory for storing a referenced picture, comprising:

a primary predictive evaluation section, supplied with an input picture and connected to said memory, for carrying out a primary motion vector search by generating primary predicted pictures using the input picture and the referenced picture from said memory to produce primary prediction error evaluated values; and a subsidiary predictive evaluation section, connected to said primary predictive evaluation section, for carrying out a subsidiary motion vector search to estimate at least one subsidiary prediction error evaluated value using the primary prediction error evaluated values, wherein said subsidiary predictive evaluation section carries out the subsidiary motion vector search without generation of subsidiary predicted pictures.

2. A motion vector search device as claimed in claim 1, wherein the primary motion vector search is a motion vector search with full pixel accuracy, the primary predicted pictures being motion-compensated predictive pictures with full pixel accuracy, the primary prediction error evaluated values being prediction error evaluated values for motion vectors with full pixel accuracy, the subsidiary motion vector search being a motion vector search with half-pixel accuracy, the subsidiary predicted pictures being motion-compensated predictive pictures with half-pixel accuracy, and the subsidiary prediction error evaluated value being a prediction error evaluated value for a motion vector with half-pixel accuracy.

3. A motion vector search device as claimed in claim 1, wherein the primary motion vector search is a motion vector search for forward prediction and for backward prediction, the primary predicted pictures comprising motion-compensated predictive pictures for the forward prediction and motion-compensated predictive pictures for the backward prediction, the primary prediction error evaluated values comprising a prediction error evaluated value for the forward prediction and a prediction error evaluated value for the backward prediction, the subsidiary motion vector search being a motion vector search for interpolative prediction, the subsidiary predicted pictures being motion-compensated predictive pictures for the interpolative prediction, and the subsidiary prediction error evaluated value being a prediction error evaluated value for the interpolative prediction.

4. A motion vector search device as claimed in claim 1, wherein the primary motion vector search is a motion vector search for same-parity field prediction and for different-parity field prediction, the primary predicted pictures comprising motion-compensated predictive pictures for the same-parity field prediction and motion-compensated predictive pictures for the different-parity field prediction, the primary prediction error evaluated values comprising a prediction error evaluated value for the same-parity field prediction and a prediction error evaluated value for the different-parity field prediction, the subsidiary motion vector search being a motion vector search for dual-field prediction, the subsidiary predicted pictures being motion-compensated predictive pictures for the dual-field prediction, and the subsidiary prediction error evaluated value being a prediction error evaluated value for the dual-field prediction.

5. A motion vector searcher for use in a moving picture coding device including a memory for storing a referenced picture, comprising:

a first motion vector searching section, supplied with an input picture and connected to said memory, for carrying out a first motion vector search with full pixel accuracy by generating primary motion-compensated predictive pictures with the full pixel accuracy using the input picture and the referenced picture from said memory to produce primary prediction error evaluated values for motion vectors with the full pixel accuracy; and a second motion vector searching section, connected to said first motion vector searching section, for carrying out a second motion vector search with half-pixel accuracy to estimate subsidiary prediction error evaluated values for motion vectors with the half-pixel accuracy using the primary prediction error evaluated values, whereby said second motion vector searching section carries out the second motion vector search without generation of subsidiary motion-compensated predictive pictures with the half-pixel accuracy.

6. A motion vector searcher as claimed in claim 5, wherein said first motion vector searching section generates the primary motion-compensated predictive pictures for candidate vectors with the full pixel accuracy in a search object to calculate the primary prediction error evaluated values indicative of differences between the input picture and the primary motion-compensated predictive pictures, said second motion vector searching section estimating the subsidiary prediction error evaluated values for subsidiary candidate vectors with half-pixel accuracy in the search object using the primary prediction error evaluated values.

7. A motion vector searcher as claimed in claim 5, wherein said first motion vector searching section generates the primary motion-compensated predictive pictures for primary candidate vectors with the full pixel accuracy in a search object to calculate the primary prediction error evaluated value indicative of differences between the input picture and the primary motion-compensated predictive pictures and to select, as a primary motion vector with the full pixel accuracy, one of the primary candidate vectors that has the minimum primary prediction error evaluated value, said second motion vector searching section searching neighbors of the primary motion vector as neighboring search objects to estimate the subsidiary prediction error evaluated values for subsidiary candidate vectors with half-pixel accuracy in the neighboring search objects using the primary prediction error evaluated values.

8. A motion vector searcher as claimed in claim 7, wherein said second motion vector searching section uses, as the neighboring search objects, eight neighboring subsidiary candidate vectors within a range of a half-pixel apart from the primary motion vector in horizontal and vertical directions.

9. A motion vector searcher as claimed in claim 7, wherein said second motion vector searching section uses, as neighboring search objects, four neighboring subsidiary candidate vectors within a range of a half-pixel apart from the primary motion vector in horizontal or vertical directions.

10. A prediction mode determiner for use in a moving picture coding device for carrying out adaptive predictive coding on an input picture, the moving picture coding device including a memory for storing a referenced picture, said prediction mode determiner comprising:

a first prediction mode evaluating section, supplied with the input picture and connected to said memory, for evaluating a first prediction mode group by generating primary predicted pictures using the input picture and the referenced picture, the first prediction mode group being a prediction mode group referring to a single frame or a single field, said first prediction mode evaluating section producing primary prediction error evaluated values for the first prediction mode group;

a second prediction mode evaluating section, connected to said first prediction mode evaluating section, for evaluating a second prediction mode group using the primary prediction error evaluated values, the second prediction mode group being a prediction mode group referring to a plurality of frames or a plurality of fields, said second prediction mode evaluating section estimating a subsidiary prediction error evaluated value for the second prediction mode group using the primary prediction error evaluated values, whereby said second prediction mode evaluating section evaluates the second prediction mode group without generation of subsidiary predicted pictures for the second prediction mode group; and a prediction mode selecting section, connected to said first and said second prediction mode evaluating sections, for selecting a prediction mode having a minimum one among the primary prediction error evaluated values and the subsidiary prediction error evaluated value.

11. A prediction mode determiner as claimed in claim 10, wherein the subsidiary prediction error evaluated value is equal to a value which is obtained by multiplying a sum of the primary prediction error evaluated values by a predetermined value.

12. A prediction mode determiner as claimed in claim 11, wherein the predetermined value is not more than 0.5.

13. A prediction mode determiner as claimed in claim 11, wherein the predetermined value is equal to 0.4375.

14. A prediction mode determiner as claimed in claim 10, wherein the first prediction mode group comprises a forward prediction mode for carrying out a forward prediction with reference to a frame in the past and a backward prediction mode for carrying out a backward prediction with reference to a frame in the future, the second prediction mode group consisting of an interpolative prediction mode for carrying out an interpolative prediction which is an average prediction of the forward prediction and the backward prediction.

15. A prediction mode determiner as claimed in claim 10, wherein the first prediction mode group comprises a same-parity field prediction mode for carrying out a same-parity field prediction with reference to a same-parity field in interlaced scanning and a different-parity field prediction mode for carrying out a different-parity field prediction with reference to a different-parity field in the interlaced scanning, the second prediction mode group consisting of a dual-field prediction mode for carrying out a dual-field prediction which is an average prediction of the same-parity field prediction and the different-parity field prediction.

* * * * *

UNITED STATES PATENT AND TRADEMARK OFFICE
CERTIFICATE OF CORRECTION

PATENT NO.   : 5,719,630
DATED        : February 17, 1998
INVENTOR(S)  : SENDA

It is certified that error(s) appears in the above-identified patent and that said Letters Patent is hereby corrected as shown below:

Column 8, line 61, delete "$MAE_{fwd}$" and insert --$MAE_{bwd}$--;

Column 12, line 65, delete "$\tilde{pp}$" and insert --$\tilde{p}$--;

Column 21, line 9, delete "For e" and insert --other--.

Signed and Sealed this

Fourth Day of August, 1998

Attest:

BRUCE LEHMAN

*Attesting Officer*   *Commissioner of Patents and Trademarks*